US011835415B2

(12) United States Patent
Ashino

(10) Patent No.: US 11,835,415 B2
(45) Date of Patent: Dec. 5, 2023

(54) PHYSICAL QUANTITY SENSOR DEVICE INCLUDING CURVED THROUGH-HOLE

(71) Applicant: FUJI ELECTRIC CO., LTD., Kawasaki (JP)

(72) Inventor: Kimihiro Ashino, Masumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/565,057

(22) Filed: Dec. 29, 2021

(65) Prior Publication Data

US 2022/0260444 A1 Aug. 18, 2022

(30) Foreign Application Priority Data

Feb. 17, 2021 (JP) ................. 2021-022957

(51) Int. Cl.
*G01L 9/00* (2006.01)
*G01L 19/00* (2006.01)

(52) U.S. Cl.
CPC ........ *G01L 9/0051* (2013.01); *G01L 19/0038* (2013.01)

(58) Field of Classification Search
None
See application file for complete search history.

(56) References Cited

U.S. PATENT DOCUMENTS

| 10,170,394 B2 * | 1/2019 | Komatsu | ................. H01L 24/83 |
| 2018/0238928 A1 * | 8/2018 | Ueno | ...................... G01F 15/14 |

FOREIGN PATENT DOCUMENTS

| JP | 2005-129498 A | 5/2005 |
| JP | 2017-037039 A | 2/2017 |
| JP | 2018-136277 A | 8/2018 |

* cited by examiner

*Primary Examiner* — Brandi N Hopkins
*Assistant Examiner* — Nigel H Plumb
(74) *Attorney, Agent, or Firm* — Rabin & Berdo, P.C.

(57) ABSTRACT

A sensor device for measuring a physical quantity. The sensor device includes a sensor element having a semiconductor chip, a first terminal electrically connected to the sensor element, and a housing portion having a terminal, which is a second terminal and is electrically connected to the first terminal. The second terminal has a through-hole formed therein, the through-hole having a first end and a second end opposite to each other, an inner surface of the through hole at the first end being an R-surface that is a curved surface with a radius R. The first terminal is housed in the housing portion, and has one end thereof inserted in the through-hole from the first end of the through-hole.

8 Claims, 25 Drawing Sheets

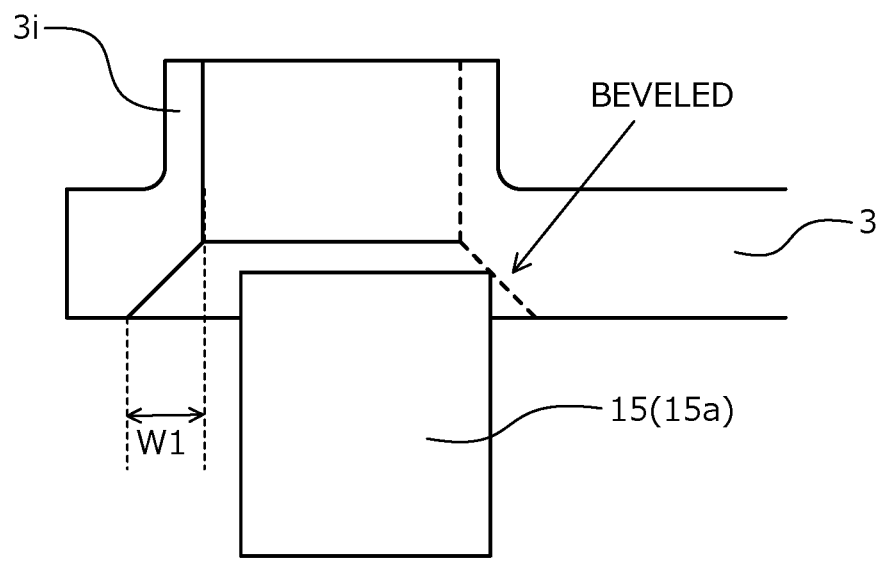

PHYSICAL QUANTITY SENSOR DEVICE INCLUDING CURVED THROUGH-HOLE

CROSS REFERENCE TO RELATED APPLICATIONS

This application is based upon and claims the benefit of priority of the prior Japanese Patent Application No. 2021-022957, filed on Feb. 17, 2021, the entire contents of which are incorporated herein by reference.

BACKGROUND OF THE INVENTION

1. Field of the Invention

Embodiments of the invention relate to a physical quantity sensor device and a method of manufacturing a physical quantity sensor device.

2. Description of the Related Art

Conventionally, many physical quantity sensors are used in automobiles and industrial machines. Physical quantity sensors include pressure sensors, acceleration sensors, etc. and are often used under extreme environments such as high-temperature and high-humidity environments. Among physical quantity sensor devices, one proposed technique is for a package configured by a screw portion and a nut portion (housing box) in which a sensor element is disposed in a recess, and a socket portion constituting an interface for propagating signals of the sensor element to an external destination. Further, a configuration has been proposed in which a socket portion is separate from both an inner housing portion and a socket housing portion. For example, by the technique proposed in Japanese Laid-Open Patent Publication No. 2017-037039, assembly may be easily performed by irradiating laser light in a through-hole of the inner housing portion, from above at a predetermined angle of incidence to thereby weld an upper end of a first lead pin and one end of a connector pin. Further, by the technique proposed in Japanese Laid-Open Patent Publication No. 2018-136277, generation of a gap due to lifting of an inner housing portion from a sensor element may be suppressed by making a shape of a hole of a portion of the inner housing portion such that a length of an opposite side of a hole is less than a diameter of a lead pin housed in the hole.

SUMMARY OF THE INVENTION

According to an embodiment of the invention, a sensor device for measuring a physical quantity includes: a sensor element having a semiconductor chip; a first terminal connected to the sensor element; and a housing portion having a terminal, which is a second terminal and is electrically connected to the first terminal. The second terminal has a through-hole formed therein, the through-hole having a first end and a second end opposite to each other, an inner surface of the through hole at the first end being an R-surface that is a curved surface with a radius R. The first terminal is housed in the housing portion, and has one end thereof inserted in the through-hole from the first end of the through-hole.

Objects, features, and advantages of the present invention are specifically set forth in or will become apparent from the following detailed description of the invention when read in conjunction with the accompanying drawings.

BRIEF DESCRIPTION OF THE DRAWINGS

FIG. 1D is an enlarged cross-sectional view of another state of portion B in FIG. 1B.

FIG. 12AB is a diagram depicting a state of the physical quantity sensor device according to the embodiment during manufacture (assembly).

FIG. 12BB is a diagram depicting a state of the physical quantity sensor device according to the embodiment during manufacture (assembly).

DETAILED DESCRIPTION OF THE INVENTION

Figure 19:
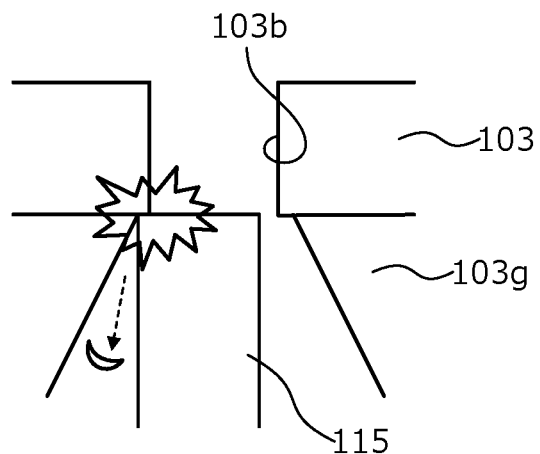
FIG. 19 is a cross-sectional view depicting insertion of a lead pin in a method of manufacturing a conventional physical quantity sensor device.

First, problems associated with the conventional techniques are discussed. FIG. 19 is a cross-sectional view depicting insertion of a lead pin in a method of manufacturing a conventional physical quantity sensor device. FIG. 19 is a diagram of an insertion process in which a lead pin 115 of a sensor element is inserted into a through-hole 103b of an inner housing portion 103 from below. At this time, a tapered portion 103g for inserting the lead pin 115 is provided in the inner housing portion 103 to ensure insertability; however, in some cases, the diameter of the through-hole 103b cannot be made the same as the diameter of the tapered portion 103g, whereby the tip of the lead pin 115 interferes with the edge of the inner housing portion 103.

The lead pin 115 of the sensor element is a rod-shaped material that has been finely cut and plated with copper (Cu) and nickel (Ni). Therefore, the shape of the tip of the lead pin 115 has a corner. As a result, a problem arises in that in an instance in which the tip of the lead pin 115 interferes with the edge of the inner housing portion 103, the tip of the lead pin 115 is shaved off by the inner housing portion 103, whereby a piece of metal drops, short-circuiting the lead pin 115 and a metal insulated from the lead pin 115, and causing a defect to occur.

Figure 20:
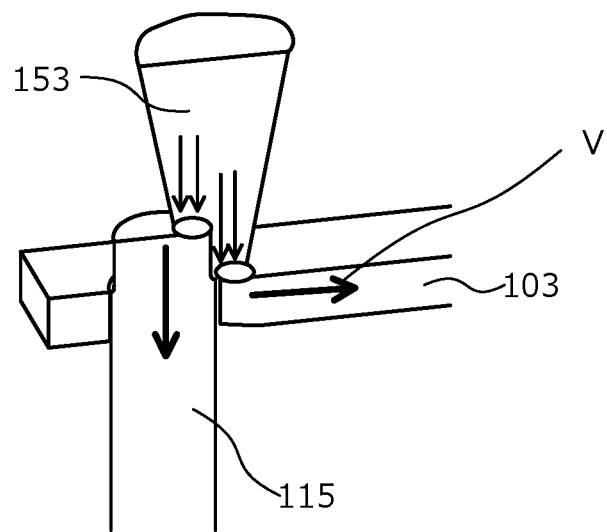
FIG. 20 is a perspective view depicting welding of a lead pin in a method of manufacturing a conventional physical quantity sensor device.

FIG. 20 is a perspective view depicting welding of a lead pin in a method of manufacturing a conventional physical quantity sensor device. The structure is such that after insertion of the lead pin 115, the tip of the lead pin 115 extends beyond the inner housing portion 103 to facilitate laser welding. Here, the distance of the face of the tip of the lead pin 115 and the distance of the surface of the inner housing portion 103 differ, and may differ from a focal point of laser light 153, whereby respective heating states of irradiated surfaces differ from each other. In this manner, some portions to be heated, due to members thereof, are not the same distance from the laser and therefore, welding becomes difficult.

Further, the lead pin 115 has a small heat capacity and therefore, even though melting is possible by less laser energy, the inner housing portion 103 has a large heat capacity and as indicated by arrow V in FIG. 20, the heat generated at the irradiation surface does not easily reach a temperature that can quickly move to and melt the members. Therefore, power of the laser energy has to be increased for welding and welding quality may degrade due to a slight deviation of welding position. In this manner, to weld things having a complex relationship between laser energy and welding, laser irradiation conditions have to be strictly adjusted and the process is difficult to manage.

Embodiments of a physical quantity sensor device and a method of manufacturing a physical quantity sensor device according to the present invention is described in detail with reference to the accompanying drawings. In the description of the embodiments below and the accompanying drawings, main portions that are identical are given the same reference numerals and will not be repeatedly described.

Figure 1A:
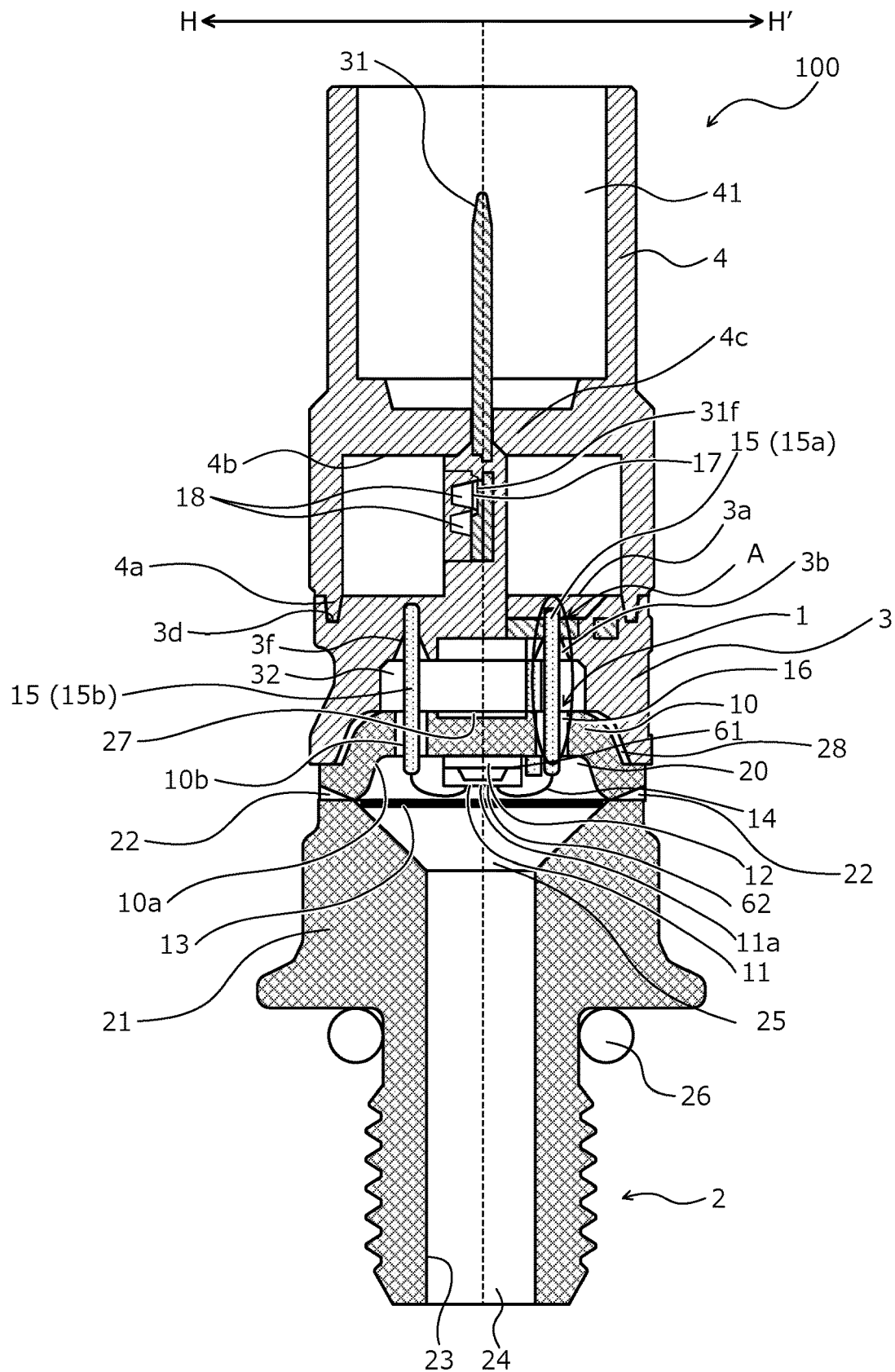
FIG. 1A is a cross-sectional view depicting a configuration of a physical quantity sensor device according to an embodiment.
Figure 2A:
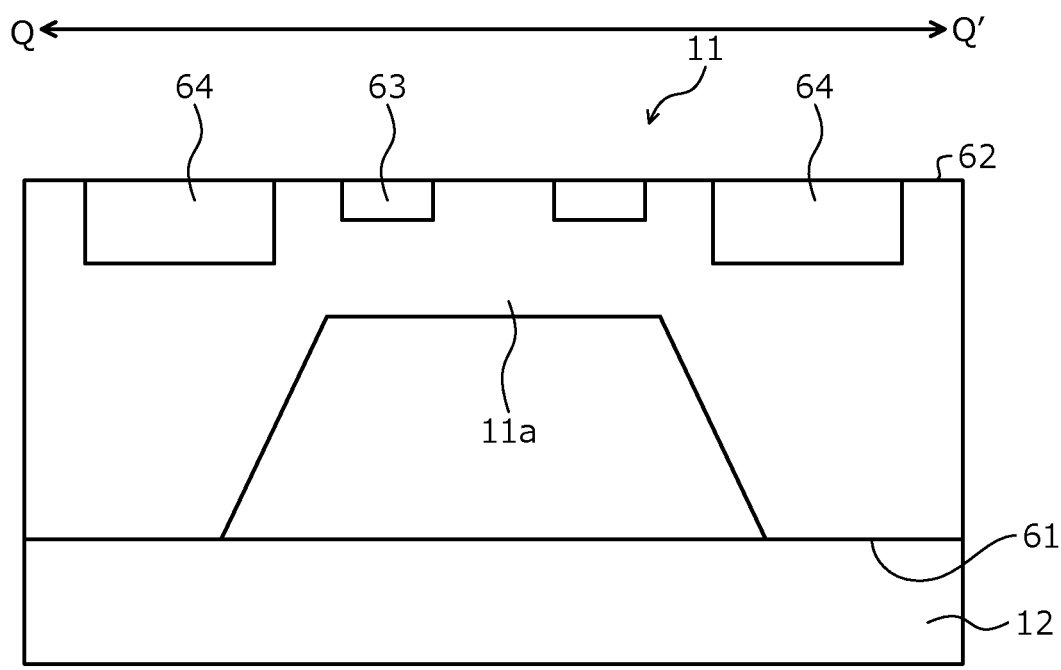
FIG. 2A is a cross-sectional view depicting a configuration of a pressure sensor chip in FIG. 1A.
Figure 2B:
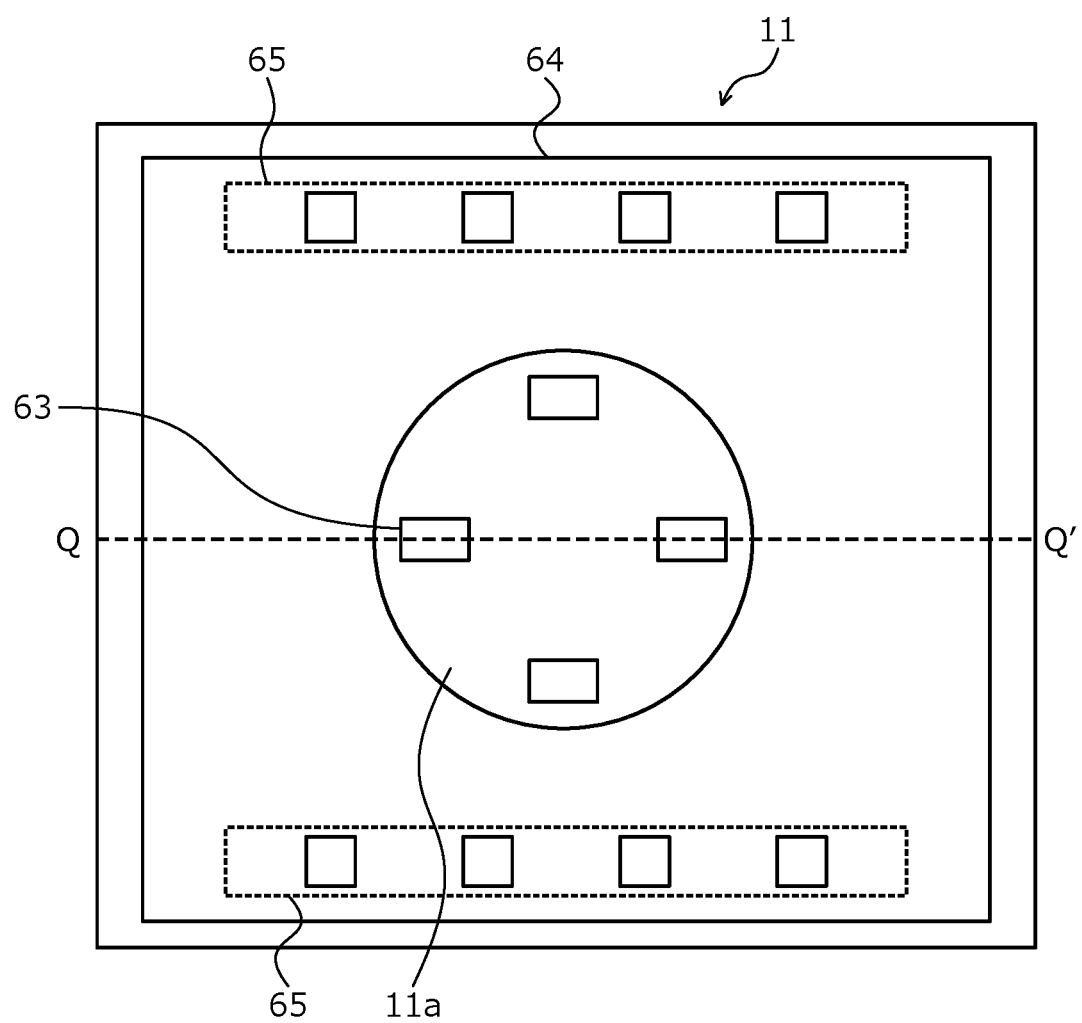
FIG. 2B is a bird's eye view of the configuration of the pressure sensor chip in FIG. 1A.

A configuration of a physical quantity sensor device according to an embodiment is described taking a pressure sensor device as an example. FIG. 1A is a cross-sectional view depicting a configuration of the physical quantity sensor device according to the embodiment. FIG. 2A and FIG. 2B are diagrams depicting a configuration of a pressure sensor chip in FIG. 1A. FIG. 2A is a cross-sectional view of a pressure sensor chip 11 and FIG. 2B is a bird's eye view of the pressure sensor chip 11. As depicted in FIG. 1A, a physical quantity sensor device 100 includes a sensor element 1, a screw portion (medium inlet portion) 2, an inner housing portion 3, and a socket housing portion (connector housing portion) 4. In the present embodiment, a configuration is assumed in which a socket portion constituting an interface for propagating signals of the sensor element to an external destination is divided into two, the inner housing portion 3 and the socket housing portion 4. The sensor element 1 includes a housing box 10, the pressure sensor chip (semiconductor chip) 11, a pedestal member 12, and a diaphragm 13 housed in a recess 10a of the housing box 10. The cross-section depicted in FIG. 1A is a cross-section at positions along cutting line H-H' shown in later-described FIG. 12BA. The housing box 10, for example, contains a metal such as a stainless steel material (SUS).

Here, with reference to FIG. 2A and FIG. 2B, the pressure sensor chip 11 is described. The cross-section depicted in FIG. 2A is a cross-section at positions along cutting line Q-Q' shown in FIG. 2B. As depicted in FIG. 2A and FIG. 2B, the pressure sensor chip 11 has, for example, a diaphragm 11a, four gauge resistors 63, and a pad region 65. The diaphragm 11a is a pressure receiving portion formed by recess processing from a first surface 61 of semiconductor silicon. The first surface 61 is an upper surface in FIG. 1A. Pressure is received by the diaphragm 11a. The four gauge resistors 63 are formed at a second surface 62 of semiconductor silicon, at locations corresponding to a back side of the diaphragm 11a. The second surface 62 is a lower surface in FIG. 1A. The four gauge resistors 63 are constituted by diffusion resistors. When pressure is applied to the pressure sensor chip 11, the second surface 62 is distorted and the gauge resistors 63 convert the distortion into resistance values. The pressure sensor chip 11 may contain another semiconductor material.

Further, on the pressure sensor chip 11, a pressure sensor element such as a Wheatstone bridge circuit configured by the gauge resistors 63, a control circuit, etc. are formed. The control circuit is formed in a control circuit region 64 of the second surface 62. The control circuit is a circuit that amplifies output signals of the pressure sensor element, a circuit that corrects sensitivity, a circuit that corrects offset, a circuit that corrects temperature characteristics of offset and sensitivity, etc. Further, on the pressure sensor chip 11, a surge protection element, a filter (not depicted), etc. are formed. The pad region 65 is formed on the second surface 62 of the pressure sensor chip 11. Electrodes provided in the pad region 65 are respectively connected to lead pins (first terminals) 15 by bonding wires 14. The electrodes provided in the pad region 65 are connected by wiring (not depicted) such as a metal to the control circuits formed in the control circuit region 64. In other words, the lead pins 15, via electrodes provided in the pad region 65 and the bonding wires 14, are connected to the control circuits formed in the control circuit region 64. Further, the pad region 65 and the control circuit region 64 are disposed at the second surface 62, in a portion thereof other than a region in which the diaphragm 11a is provided. Further, the pad region 65 may be disposed in a portion of the control circuit region 64.

The first surface 61 of the pressure sensor chip 11 is attached to a bottom of the recess 10a of the housing box 10 via the pedestal member 12. The pedestal member 12, while not particularly limited hereto, for example, contains a glass material, in other words, a Pyrex (registered trademark) glass, a heat-resistant glass, etc. The pedestal member 12 and the pressure sensor chip 11 are bonded to each other by electrostatic bonding. The pedestal member 12 and the housing box 10 are adhered to each other by an adhesive (not depicted). The lead pins 15 are terminal pins for carrying out signals of the sensor element 1 and are disposed in plural.

The lead pins 15 respectively pass through different through-holes 10b of the housing box 10, penetrate through the housing box 10, and are fixed to the housing box 10, for example, by an insulating member 16 such as a glass that closes the through-holes 10b. One end of each of the lead pins 15 (hereinafter, lower ends thereof) protrudes downward (toward the screw portion 2) from the recess 10a of the housing box 10 and is connected, by the bonding wires 14, to electrodes provided in the pad region 65 on the second surface 62 of the pressure sensor chip 11. Other ends (hereinafter, upper ends) of the lead pins 15 protrude upward (toward the socket housing portion 4) from a side of the housing box 10, opposite to that having the recess 10a of the housing box 10. On the side of the housing box 10, opposite to that having the recess 10a, a recessed portion 27 is provided. The recessed portion 27 is provided to suppress a concentration of stress at the insulating member 16.

In particular, of the multiple lead pins 15, lower ends of lead pins (hereinafter, first lead pins) 15a that are a power source terminal, a ground terminal, and an output terminal are connected to electrodes of the pressure sensor element by the bonding wires 14, respectively. Upper ends of the first lead pins 15a penetrate through through-holes 3b of the inner housing portion 3.

On the other hand, of the multiple lead pins 15, lower ends of lead pins (hereinafter, second lead pins) 15b for characteristics adjustment/trimming are respectively connected to electrodes of a predetermined control circuit by the bonding wires 14, respectively. The second lead pins 15b are used to perform characteristics adjustment/trimming during assembly of the physical quantity sensor device 100 and are not used after the characteristics adjustment/trimming. A length of the first lead pins 15a and a length of the second lead pins 15b are the same.

Here, a vertical direction is an axial direction of the lead pins 15. A horizontal direction is a direction orthogonal to the axial direction of the lead pins 15. The lead pins 15, for example, contain a metal such as an iron-nickel alloy (50Ni—Fe) containing about 50 wt % of a 42 alloy (42Alloy) or nickel (Ni) and iron (Fe) for the remaining percentage.

Figure 1B:
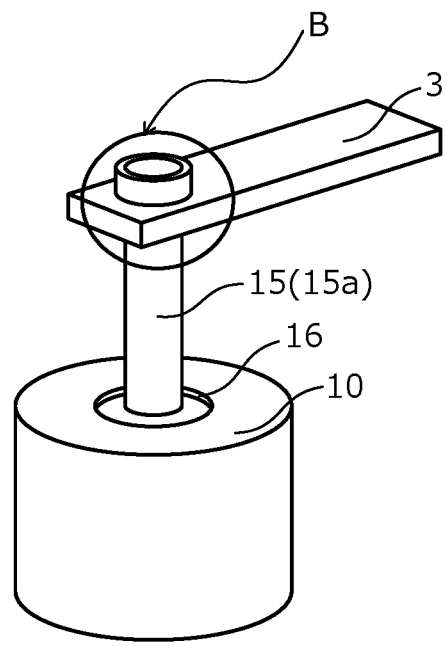
FIG. 1B is an enlarged perspective view of portion A in FIG. 1A.
Figure 1C:
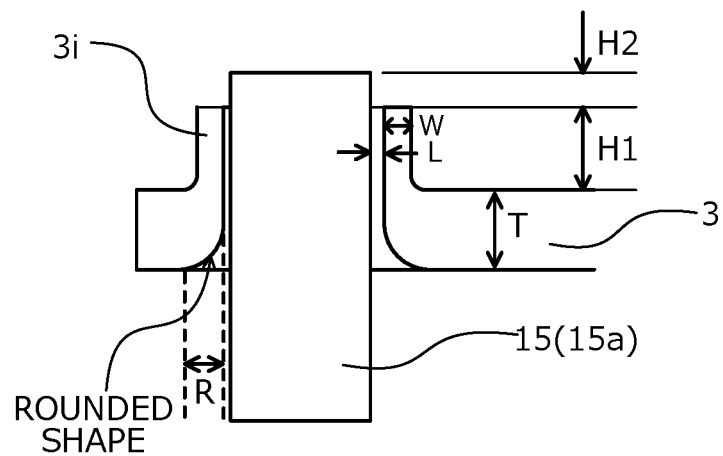
FIG. 1C is an enlarged cross-sectional view of portion B in FIG. 1B.

FIG. 1B is an enlarged perspective view of portion A in FIG. 1A. FIG. 1C is an enlarged cross-sectional view of portion B in FIG. 1B. In the embodiment, a burring process is performed to the through-holes 3b of the inner housing portion 3. By the burring process that is a press processing technique, in the inner housing portion 3, an R-surface is formed on a first side of the through-holes 3b from which the first lead pins 15a are inserted. The R-surface is a surface with a gently curved surface (curve) provided at a corner portion. As described hereinafter, by the R-surface, the tips of the first lead pins 15a may be prevented from being partially shaved off by the inner housing portion 3 and pieces of the metal may be prevented from dropping. Further, by the burring process, a pipe-shaped portion 3i is formed at the surface of the inner housing portion 3, opposite to the surface thereof where the R-surface of the inner housing portion 3 is formed.

Here, preferably, a radius R of the R-surface may be at least a half of a plate thickness T of the inner housing portion 3 and at most the plate thickness T of the inner housing portion 3 ($\frac{1}{2}$≤R≤T). The greater is the radius R of the R-surface, the smaller is a load in an instance in which one of the tips of the first lead pins 15a is in contact with the inner housing portion 3 and therefore, preferably, the radius R may be large. Nonetheless, when the radius R is large, fabrication becomes difficult and therefore, preferably, the radius R may be at most T.

Further, a difference of the distance to the laser during welding decreases and therefore, preferably, a relationship between a height H1 of the pipe-shaped portion 3i and a protruding height H2 of the first lead pins 15a may be H2≤±H½. Here, an instance of "+", as depicted in FIG. 1C, is an instance in which the first lead pins 15a protrude from the pipe-shaped portion 3i and an instance of "−" is an instance in which the first lead pins 15a are recessed from the pipe-shaped portion 3i.

Further, the diameter of the first lead pins 15a may be 0.45 mm±0.035 mm, and a distance L between the first lead pins 15a and the pipe-shaped portion 3i may be at most 0.07 mm. This is because when this is exceeded, heat escapes from the gap when the first lead pins 15a and the pipe-shaped portion 3i are laser welded. Further, preferably, a width W of the pipe-shaped portion 3i may be W<T.

FIG. 1D is an enlarged cross-sectional view of another state of portion B in FIG. 1B. As depicted in FIG. 1D, instead of the R-surface, a beveled shape may be formed at the through-holes 3b of the inner housing portion 3. The beveled shape is a shape in which the corner is beveled (chamfered) to have a flat surface, and the beveled angle is not limited to 45 degrees. Further, the width W1 of beveled shape may be preferably a same size as that of the radius R of the R-surface.

The screw portion 2, for example, contains a metal such as SUS. In a center of the screw portion 2, a through-hole (inlet opening) 23 through which a medium that is subject to measurement such as air that is a gas for which a pressure thereof is measured or an oil that is a liquid for which a pressure thereof is measured is provided in the vertical direction. An opening of the through-hole 23 at a first open end of the screw portion 2 is a pressure inlet opening 24. The housing box 10 is placed on a pedestal 21 provided at the second open end of the screw portion 2, so that the recess 10a of the housing box 10 and an opening 25 of the through-hole 23 face each other, the opening 25 being at a second open end of the screw portion 2 and the diaphragm 13 intervening between the opening 25 and the housing box 10. A periphery of stacked portions of the pedestal 21 of the screw portion 2, the diaphragm 13, and the housing box 10 is joined by laser welding.

The diaphragm 13 is a thin wavy metal plate containing, for example, a metal such as SUS. The diaphragm 13 is disposed so as to close the opening of the recess 10a of the housing box 10 and the second open end of the screw portion 2. A space surrounded by the recess 10a of the housing box 10 and the diaphragm 13 is filled with a liquid (pressure medium) 20 such as a silicone oil that transmits pressure to the pressure sensor chip 11. Reference numeral 22 of the periphery of the stacked portions (joined portions) of the pedestal 21 of the screw portion 2, the diaphragm 13, and the housing box 10 represents welded portions of the pedestal 21 of the screw portion 2 and the housing box 10. Reference numeral 26 represents an O-ring.

The inner housing portion 3 is a resin member integrally molded with connector pins (second terminals) 31 and has a substantially recessed shape surrounding a periphery and an upper portion of the sensor element 1. In particular, the inner housing portion 3 is adhered to an outer peripheral portion of the housing box 10 by an adhesive 28, the outer peripheral portion being on the side of the housing box 10, opposite to the side thereof having the recess 10a. The adhesive 28 intervenes in substantially an entire area of contact surfaces between the housing box 10 and the inner housing portion 3. One surface of the adhered surfaces of the inner housing portion 3 and the housing box 10 may have a cross-section in which recesses and protrusions are arranged to repeatedly alternate one another (for example, zigzagged like a saw blade) and the amount of adhesive at this adhered surface may be increased, whereby adhesion between the inner housing portion 3 and the housing box 10 may be facilitated. A recess 32 of the inner housing portion 3 has a depth enabling the second lead pins 15b to be housed.

The through-holes 3b for passing the first lead pins 15a therethrough are provided in a portion (hereinafter, upper portion of the inner housing portion 3) 3a of the inner housing portion 3 covering a top of the sensor element 1. Further, the connector pins 31 are formed integrated with the upper portion 3a of the inner housing portion 3. The connector pins 31 are signal terminals that exchange signals between the physical quantity sensor device 100 and an external destination. First ends 31a of the connector pins 31 (refer to later-described FIG. 3A to FIG. 3C) respectively have through-holes 31e connected to the through-holes 3b of the inner housing portion 3. In recesses 31f provided in vertical portions 31c of the connector pins 31 (refer to later-described FIG. 3A to FIG. 3C), chip capacitors 18 are attached by bonding members 17. The chip capacitors 18 are attached between adjacent connector pins of the connector pins 31. Configuration of the connector pins 31 is described hereinafter using FIG. 3A and FIG. 3B.

The upper ends of the first lead pins 15a and the first ends 31a of the connector pins 31, during assembly, are irradiated with laser light from above, at a predetermined angle of incidence (angle inclined about 3 degrees relative to the vertical direction). By this laser welding, the upper ends of the first lead pins 15a are joined to the first ends 31a of the connector pins 31. The connector pins 31, for example, contain a metal such as phosphor bronze (alloy containing tin (Sn) with copper (Cu)), a 42 alloy, 50Ni—Fe, etc., and the connector pins 31 and the lead pins 15 are melted and joined to one another by the irradiation of the laser light.

The socket housing portion 4 is a connection portion for external wiring and houses the vertical portions 31c of the connector pins 31 (refer to later-described FIG. 3A to FIG. 3C). The socket housing portion 4 has, for example, a substantially cylindrical shape surrounding a periphery of the vertical portions 31c of the connector pins 31. For example, the connector pins 31 penetrate through through-holes 4c of a bottom 4b of the socket housing portion 4 and protrude in a space 41 surrounded by the socket housing portion 4. The socket housing portion 4 is adhered to an outer peripheral portion of the upper surface of the upper portion 3a of the inner housing portion 3 by an adhesive (not depicted). The adhesive intervenes in substantially an entire area of contact surfaces between the inner housing portion 3 and the socket housing portion 4. A protrusion 4a and a recess 3d that fit each other may be provided at joined surfaces between the socket housing portion 4 and the inner housing portion 3.

Preferably, maximum diameters of the pedestal 21 of the screw portion 2, the housing box 10, the inner housing portion 3, and the socket housing portion 4 may be substantially equal. A reason for this is as follows. As described hereinafter, the screw portion 2, the housing box 10, the inner housing portion 3, and the socket housing portion 4 are sequentially stacked and joined (or adhered) to one another. Therefore, by setting the maximum diameters of the pedestal 21 of the screw portion 2, the housing box 10, the inner housing portion 3, and the socket housing portion 4 to be substantially equal, size reductions in a diameter direction (the horizontal direction) may be facilitated.

In the physical quantity sensor device 100 configured as described above, the pressure medium is introduced from the pressure inlet opening 24 and when pressure is received by the diaphragm 11a of the pressure sensor chip 11, the diaphragm 11a is deformed. Then, gauge resistor values on the diaphragm 11a change and a voltage signal corresponding to this change is generated. This voltage signal is amplified by an amplifier circuit adjusted by adjusting circuits such as a sensitivity correcting circuit, an offset correcting circuit, a temperature characteristics correcting circuit, and is output from the pressure sensor chip 11. Subsequently, this output signal is output to the first lead pins 15a via the bonding wires 14.

Next, a method of manufacturing (assembling) the physical quantity sensor device 10 is described. FIGS. 3A, 3B, 3C, 3D, 4, 5A, 5B, 6, 7, 8, 9, 10, 11, 12AA, 12AB, 12BA, 12BB, 13A, 13B, 14, 15A, 15B, 15C, 16, 17A, 17B, and 18 are diagrams depicting states of the physical quantity sensor device according to the embodiment during manufacture (assembly).

Figure 3A:
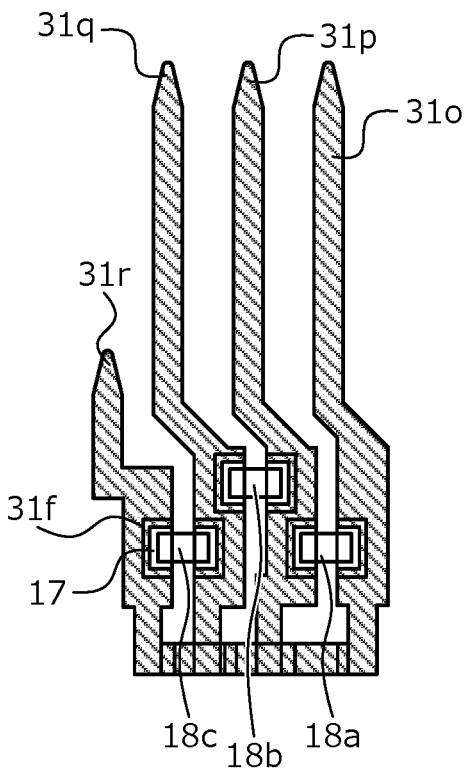
FIG. 3A is a diagram depicting a state of the physical quantity sensor device according to the embodiment during manufacture (assembly).

First, the inner housing portion 3 and the connector pins 31 connected to the chip capacitors 18 are described using FIG. 3A to FIG. 5B. FIG. 3A to FIG. 3C depict only the connector pins 31 and the chip capacitors 18 while the inner housing portion 3 is omitted.

Figure 3B:
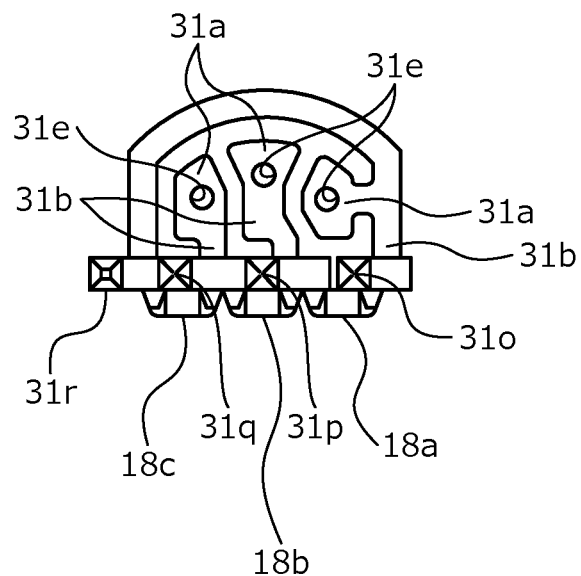
FIG. 3B is a diagram depicting a state of the physical quantity sensor device according to the embodiment during manufacture (assembly).
Figure 3C:
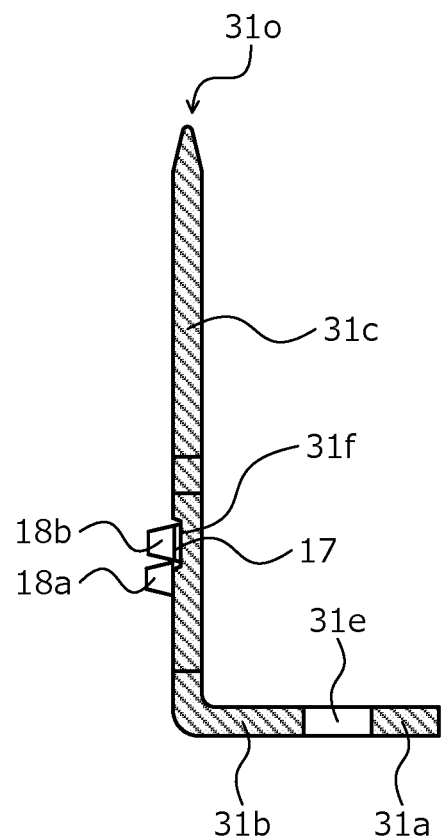
FIG. 3C is a diagram depicting a state of the physical quantity sensor device according to the embodiment during manufacture (assembly).
Figure 3D:
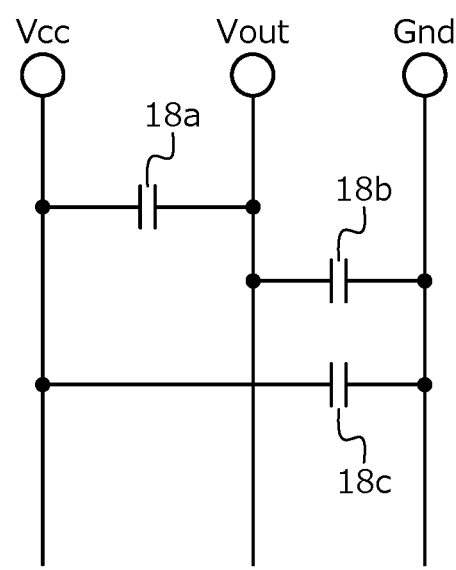
FIG. 3D is a diagram depicting a state of the physical quantity sensor device according to the embodiment during manufacture (assembly).

FIG. 3A to FIG. 3C depict the connector pins 31 as viewed from different directions. In FIG. 3D, an equivalent circuit of the chip capacitors 18 that connect the connector pins 31 to each other is depicted. A first connector pin 31o and a fourth connector pin 31r are signal terminal pins that supply power source signals for supplying supply voltage and are connected to the lead pins 15 that are power source terminals. A second connector pin 31p is a signal terminal pin for carrying out sensor signals and is connected to the lead pins 15 that are output terminals. A third connector pin 31q is a signal terminal pin for connecting to a ground (Gnd) and is connected to the lead pin 15 that is a ground terminal. Further, to install the chip capacitors 18 between the signal terminal pin for carrying out sensor signals (Vout) and the signal terminal pin for connecting to the ground (Gnd), two signal terminal pins for supplying power supply signals (Vcc) are provided at both ends like the first connector pin 31o and the fourth connector pin 31r.

In a cross-sectional view, the first connector pin 31o to the third connector pin 31q each has a substantially L-shape formed by a portion (hereinafter, horizontal portion (first portion)) 31b embedded in the upper portion 3a of the inner housing portion 3 and a portion (hereinafter, vertical portion) 31c connected to the horizontal portion 31b so as to protrude upward and orthogonal to the horizontal portion 31b (the first connector pin 31o is depicted in the example in FIG. 3C). The fourth connector pin 31r, in a cross-sectional view, has a substantially I-shape having only the vertical portion 31c (not depicted).

The first ends 31a of the first connector pin 31o to the third connector pin 31q are formed so as to surround a periphery of the through-holes 31e (FIG. 3B). The ends 31a of the first connector pin 31o to the third connector pin 31q may be formed to have, in a plan view, a substantially semicircular shape surrounding a portion of the periphery of the through-holes 31e or may have, in a plan view, a linear shape reaching sidewalls of the through-holes 31e and exposed at portions of the sidewalls of the through-holes 31e (not depicted).

Further, the horizontal portion 31b of the first connector pin 31o is disposed so as to surround the end 31a of the first connector pin 31o, the horizontal portion 31b and the end 31a of the second connector pin 31p, and the horizontal portion 31b and the end 31a of the third connector pin 31q; and the horizontal portion 31b of the first connector pin 31o is integrally connected to the fourth connector pin 31r (FIG. 3B). As a result, the first connector pin 31o and the fourth connector pin 31r have a same potential.

First, the chip capacitors 18 are attached to the connector pins 31 by the bonding members 17 such as solder or a conductive adhesive. For example, the first connector pin 31o and the second connector pin 31p are connected via a chip capacitor 18a (FIG. 3A, FIG. 3B). For example, the second connector pin 31p and the third connector pin 31q are connected via a chip capacitor 18b (FIG. 3A, FIG. 3B). For example, the third connector pin 31q and the fourth connector pin 31r are connected via a chip capacitor 18c (FIG. 3A, FIG. 3B). In this manner, the connector pins 31 are connected to one another via the chip capacitors 18 (FIG. 3A, FIG. 3B). As described above, the end 31a of the first connector pin 31o is connected to the vertical portion 31c of the fourth connector pin 31r. Thus, the chip capacitors 18 may be attached between the terminals (FIG. 3D).

In the example in FIG. 3A to FIG. 3D, while the chip capacitors 18 are attached between the terminals, configuration is not limited hereto. For example, whether the chip capacitor 18c between the fourth connector pin 31r and the third connector pin 31q is to be provided may be determined according to a surge requirement. For example, in an instance in which the chip capacitor 18c is provided, electromagnetic compatibility (EMC) tolerance is enhanced compared to an instance in which the chip capacitor 18c is not provided.

Next, the connector pins 31 are inserted into a formation mold for the inner housing portion 3. Subsequently, a resin material is poured into the mold, whereby the inner housing portion 3 is integrally molded (insert molded) with the connector pins 31.

Figure 4:
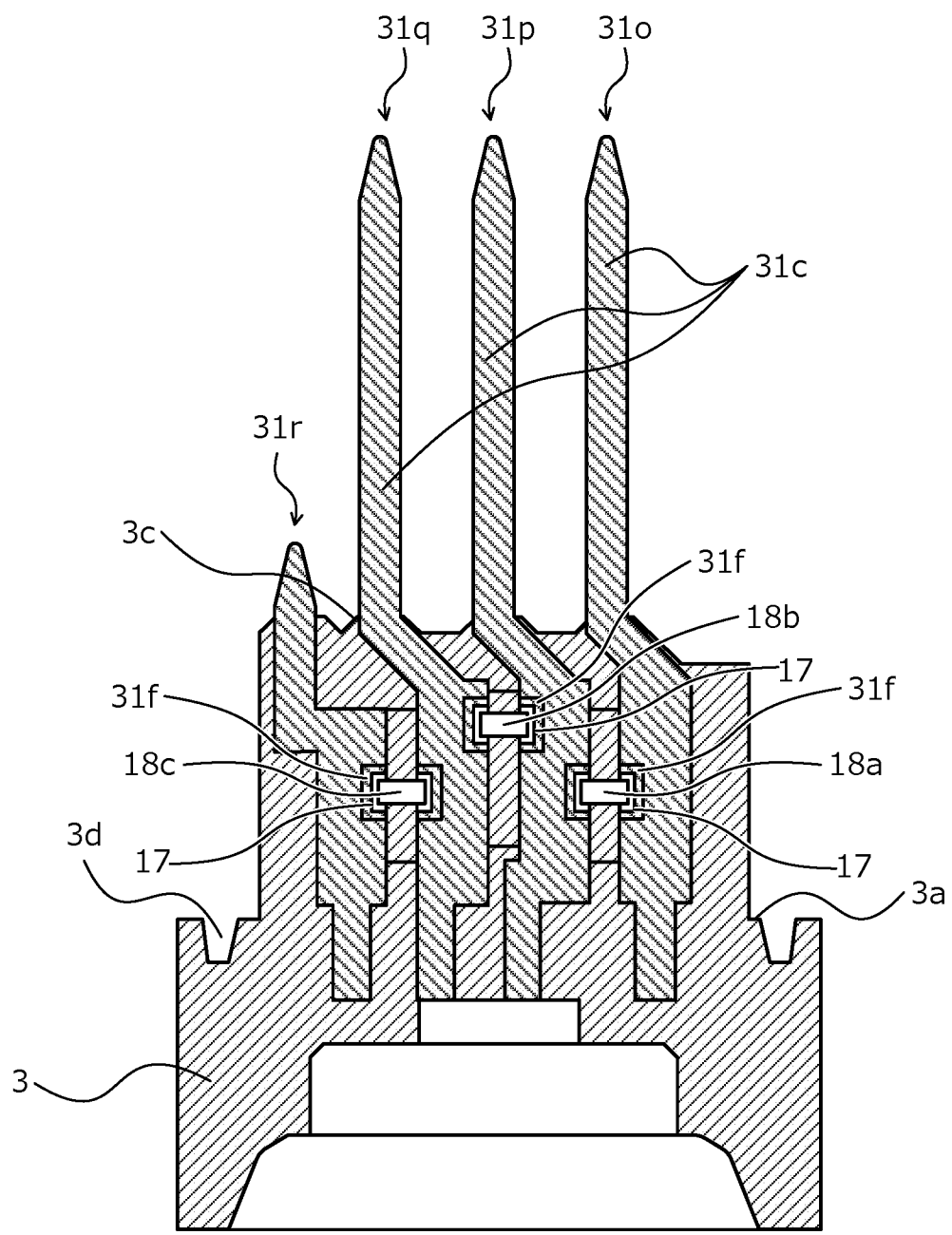
FIG. 4 is a diagram depicting a state of the physical quantity sensor device according to the embodiment during manufacture (assembly).
Figure 5A:
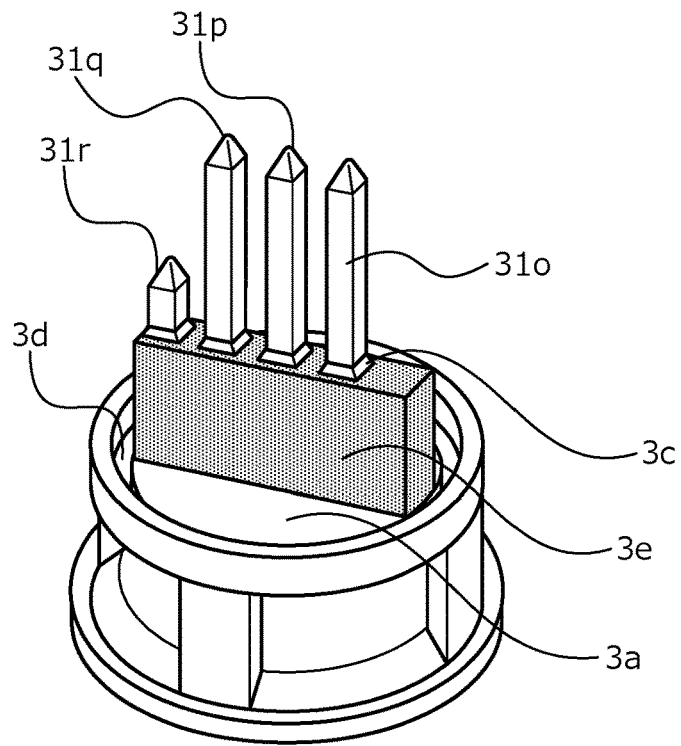
FIG. 5A is a diagram depicting a state of the physical quantity sensor device according to the embodiment during manufacture (assembly).
Figure 5B:
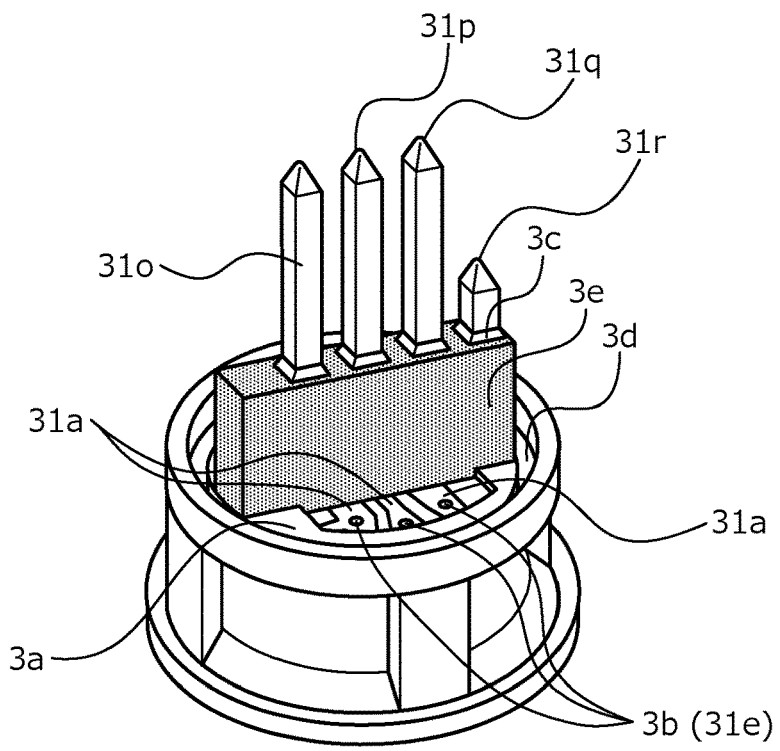
FIG. 5B is a diagram depicting a state of the physical quantity sensor device according to the embodiment during manufacture (assembly).

In FIG. 4, a cross-section of the inner housing portion 3 is depicted. In FIG. 5A and FIG. 5B, an external view of the inner housing portion is depicted. In the inner housing portion 3, the recess 3d that fits a joint surface joined to the socket housing portion 4 is provided (FIG. 4, FIG. 5A, FIG. 5B).

In the upper portion 3a of the inner housing portion 3, the through-holes 3b for passing therethrough the first lead pins 15a are provided (FIG. 5B). The through-holes 3b are provided at same positions as those of the through-holes 31e (refer to FIG. 3B, FIG. 3C) of the connector pins 31. Therefore, the through-holes 3b at the surface seen from the side that the connector pins 31 of the inner housing portion 3 are exposed are the same as the through-holes 31e. Nonetheless, as depicted in later-described FIGS. 12BA and 12BB, the through-holes 3b of a back surface seen from the side that the connector pins 31 of the inner housing portion 3 are exposed are through-holes formed by a resin. Further, the connector pins 31 are integrally molded in the upper portion 3a of the inner housing portion 3, (FIG. 4, FIG. 5A, FIG. 5B). For example, the vertical portions 31c of the connector pins 31 are partially exposed from the inner housing portion 3 (FIG. 4). For example, the upper portion 3a of the inner housing portion 3 covers the horizontal portion 31b of the connector pins 31. The first ends 31a of the connector pins 31 are exposed from the upper portion 3a of the inner housing portion 3. These exposed portions of the first ends 31a of the connector pins 31 and the first lead pins 15a are welded to one another.

Further, an upper end 3e of the inner housing portion 3 covers the bonding members 17 and the chip capacitors 18 attached to the connector pins 31.

Next, a process of attaching the lead pins 15 to the housing box 10 to a process of sealing by injection of a pressure medium are described using FIG. 6 to FIG. 11.

Figure 6:
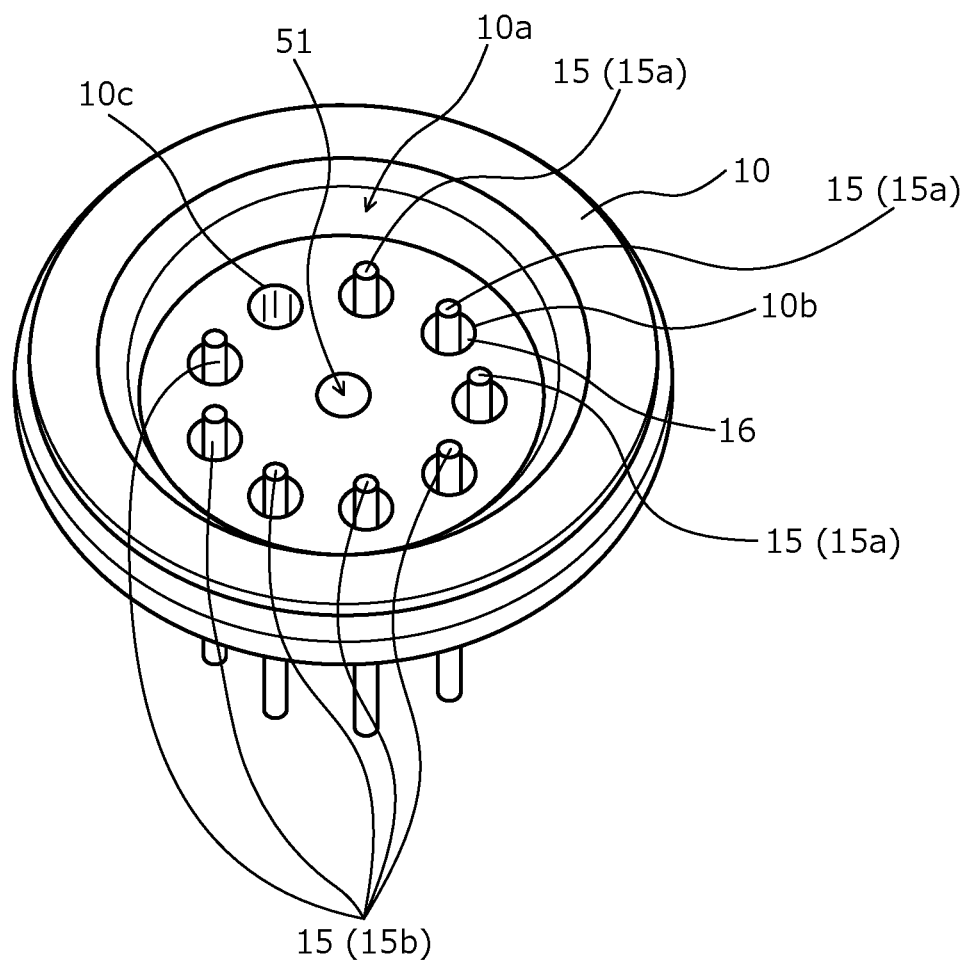
FIG. 6 is a diagram depicting a state of the physical quantity sensor device according to the embodiment during manufacture (assembly).

As depicted in FIG. 6, the lead pins 15 respectively penetrate through the through-holes 10b of the housing box 10. Here, as an example, an instance is described in which, in a plan view, the housing box 10 has a substantially circular shape, and the through-holes 10b are provided along a perimeter of a circle having a common center with the bottom of the recess 10a of the housing box 10. One of multiple holes is a hole 10c for injecting an oil that is a pressure medium and the remaining holes are the through-holes 10b through which the lead pins 15 penetrate.

Figure 7:
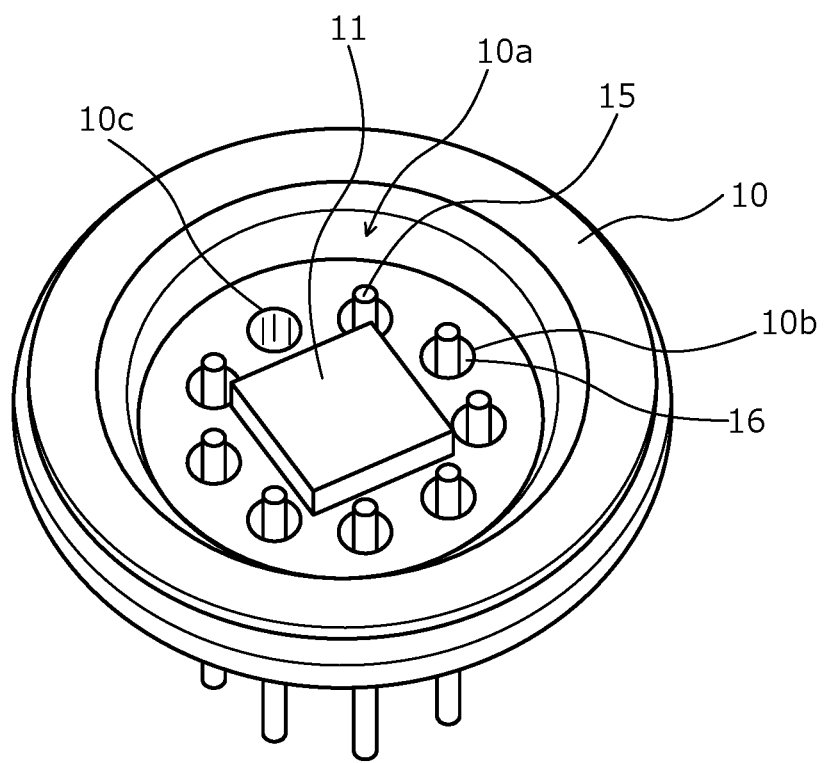
FIG. 7 is a diagram depicting a state of the physical quantity sensor device according to the embodiment during manufacture (assembly).
Figure 8:
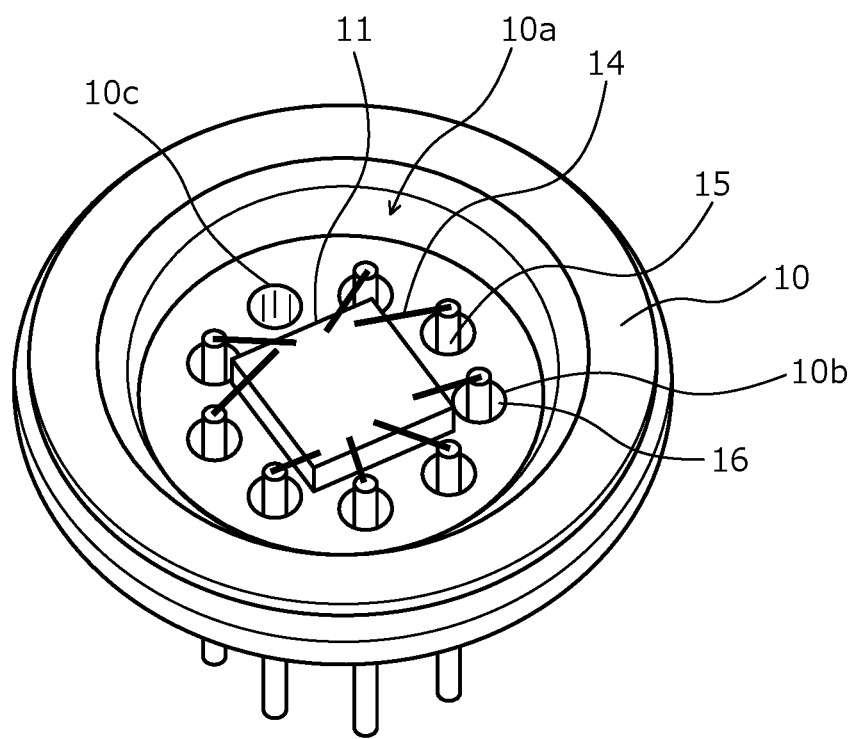
FIG. 8 is a diagram depicting a state of the physical quantity sensor device according to the embodiment during manufacture (assembly).
Figure 9:
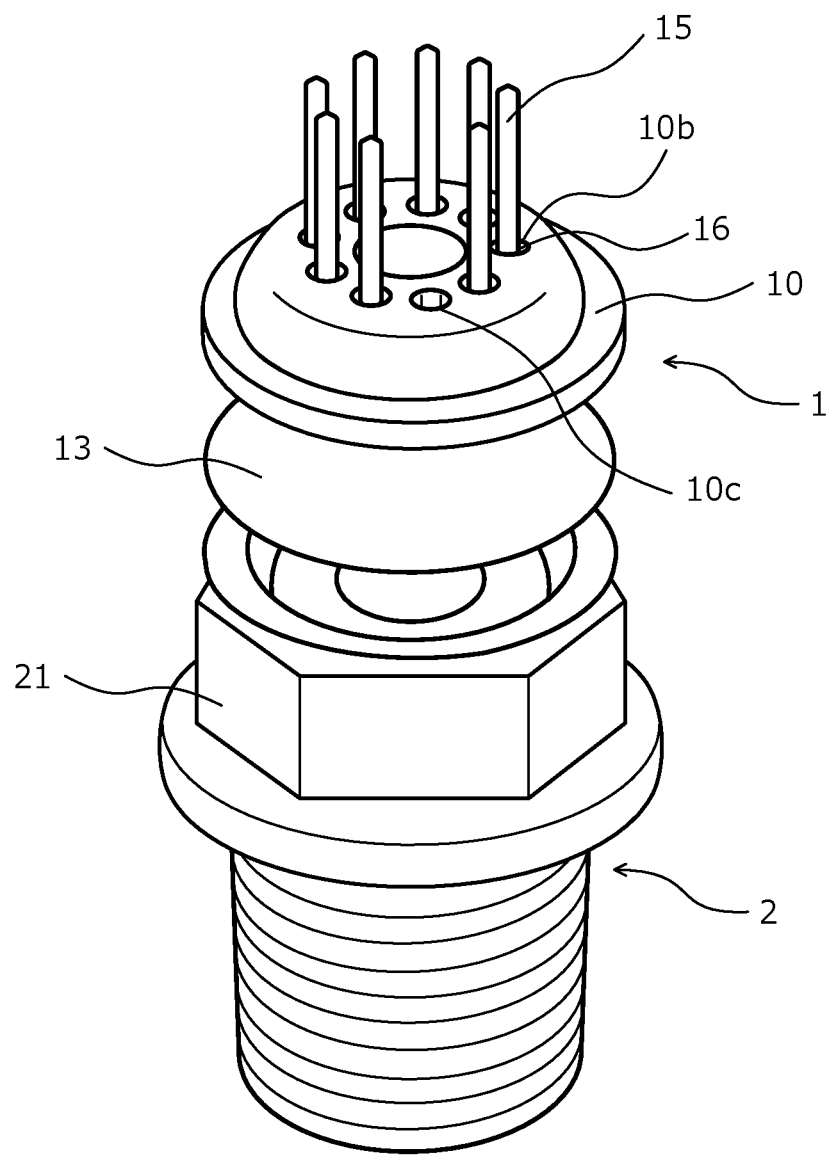
FIG. 9 is a diagram depicting a state of the physical quantity sensor device according to the embodiment during manufacture (assembly).

Next, the insulating member 16 such as a glass is poured into the through-holes 10b of the housing box 10, thereby joining (air-tight sealing) the lead pins 15 and the housing box 10. Next, an adhesive 51 is applied to the recess 10a of the housing box 10, for example, at a center thereof free of the through-holes 10b. Next, as depicted in FIG. 7, the pressure sensor chip 11 is mounted and adhered on the adhesive 51 at the bottom of the recess 10a of the housing box 10. Next, as depicted in FIG. 8, the electrodes of the pressure sensor chip 11 and the lead pins 15 are electrically connected to one another by the bonding wires 14. Next, as depicted in FIG. 9, the housing box 10 is mounted on the pedestal 21 of the screw portion 2, with the side having the recess 10a facing downward (facing the screw portion 2)

and the diaphragm 13 intervening therebetween; stacked portions of these members, for example, are joined by laser welding.

Figure 10:
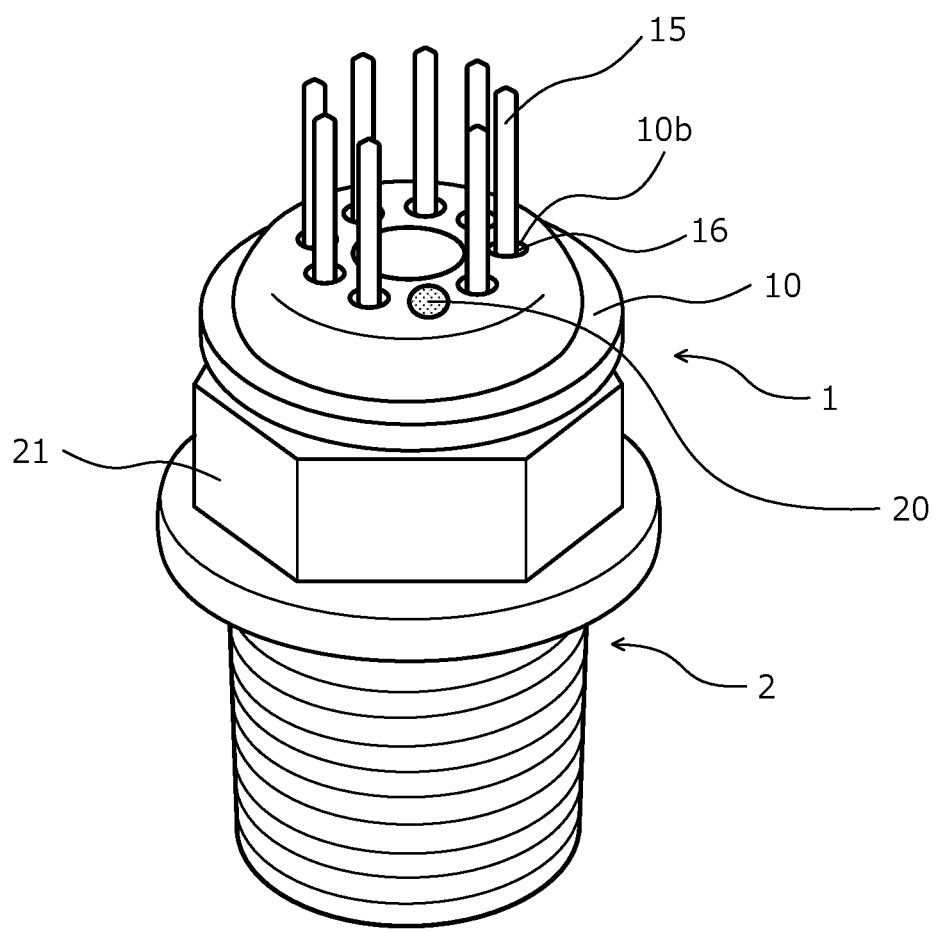
FIG. 10 is a diagram depicting a state of the physical quantity sensor device according to the embodiment during manufacture (assembly).
Figure 11:
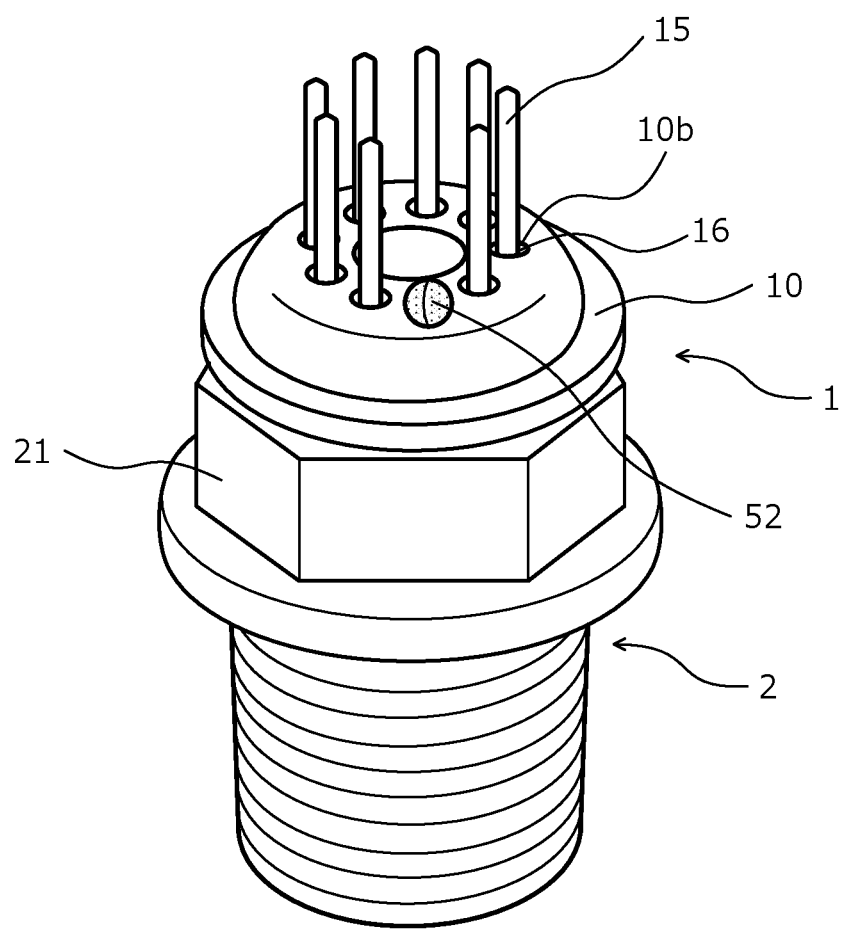
FIG. 11 is a diagram depicting a state of the physical quantity sensor device according to the embodiment during manufacture (assembly).

Next, as depicted in FIG. 10, under a vacuum atmosphere, a liquid 20 such as a silicone oil is injected from the hole 10c of the housing box 10 into a space surrounded by the recess 10a of the housing box 10 and the diaphragm 13. Next, as depicted in FIG. 11, for example, a metal ball 52 containing a metal such as SUS is pushed in the hole 10c through which the liquid 20 is injected and voltage is applied. As a result, the metal ball 52 is welded (resistance welded) in the opening of the hole 10c, thereby sealing in the liquid 20. Next, characteristics adjustment/trimming of the sensor element 1 is performed by a general method.

Figure 12A:
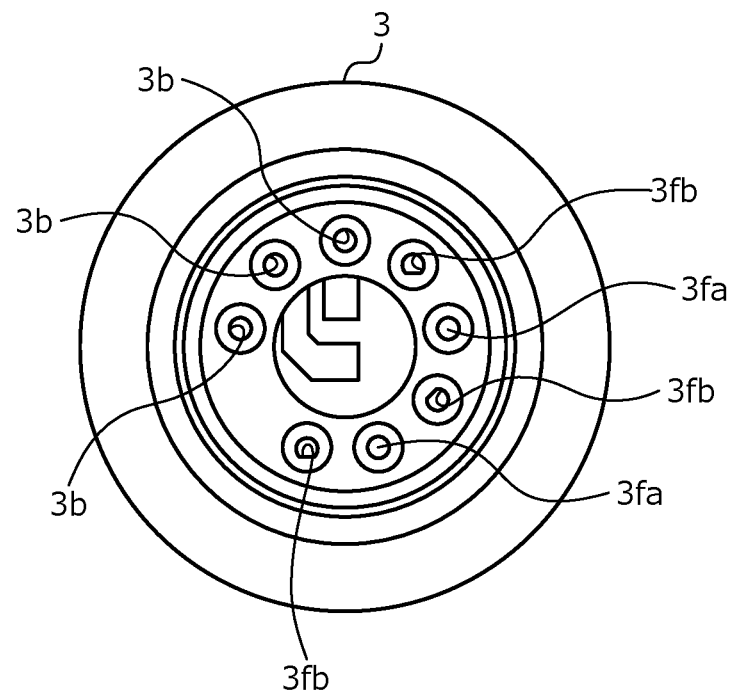
FIG. 12AA is a diagram depicting a state of the physical quantity sensor device according to the embodiment during manufacture (assembly).
Figure 12A:
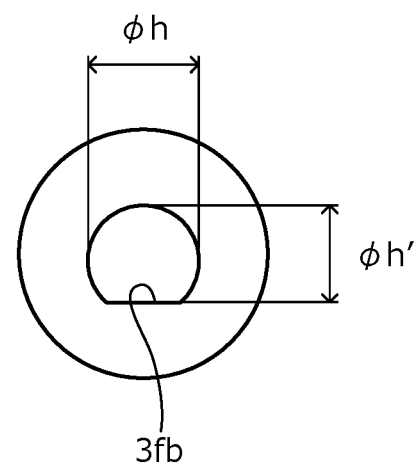
Figure 16:
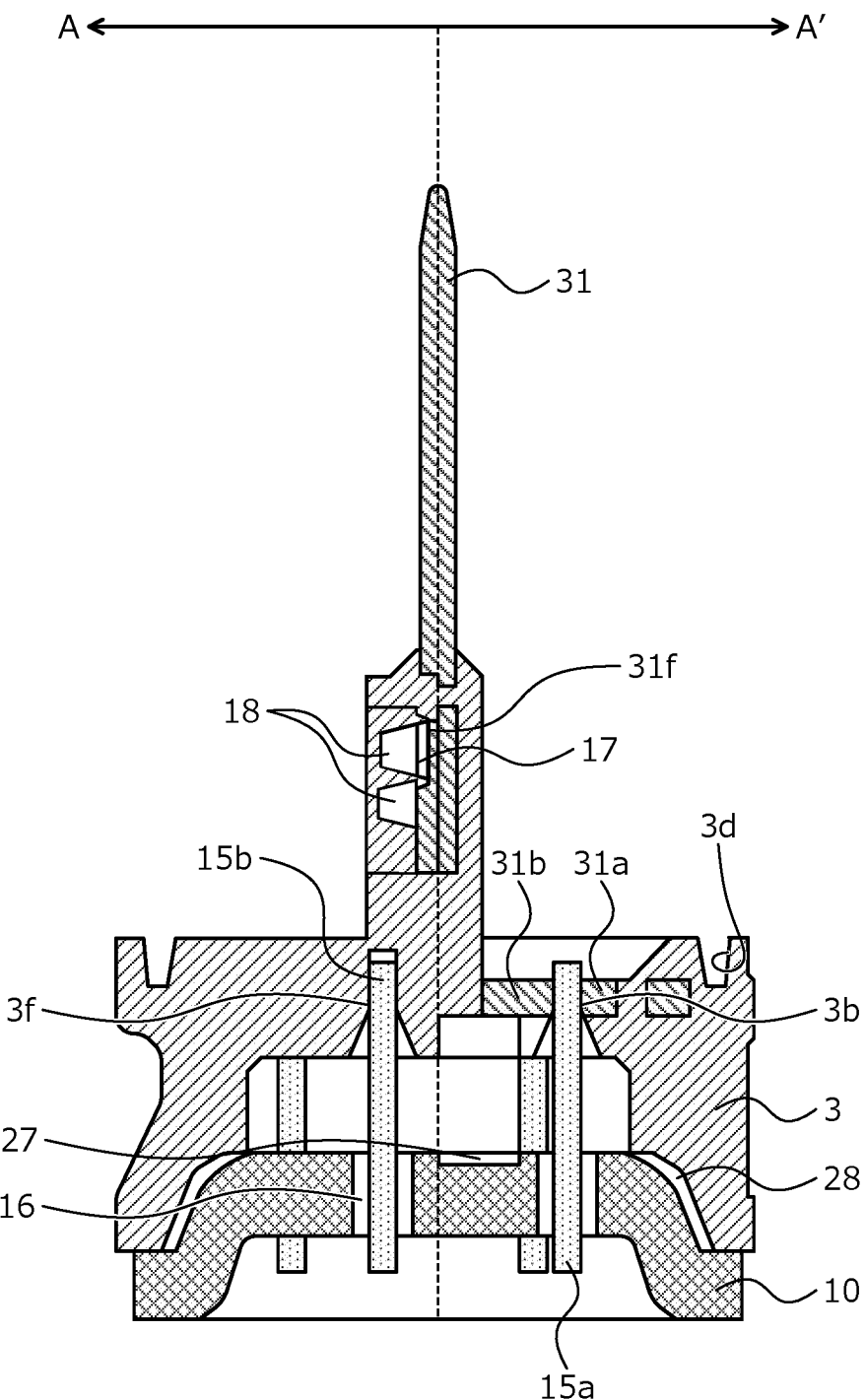
FIG. 16 is a diagram depicting a state of the physical quantity sensor device according to the embodiment during manufacture (assembly).

Next, a process of adhering the inner housing portion 3 and the housing box 10 to each other is described using FIG. 12AA to FIG. 16.

Figure 12B:
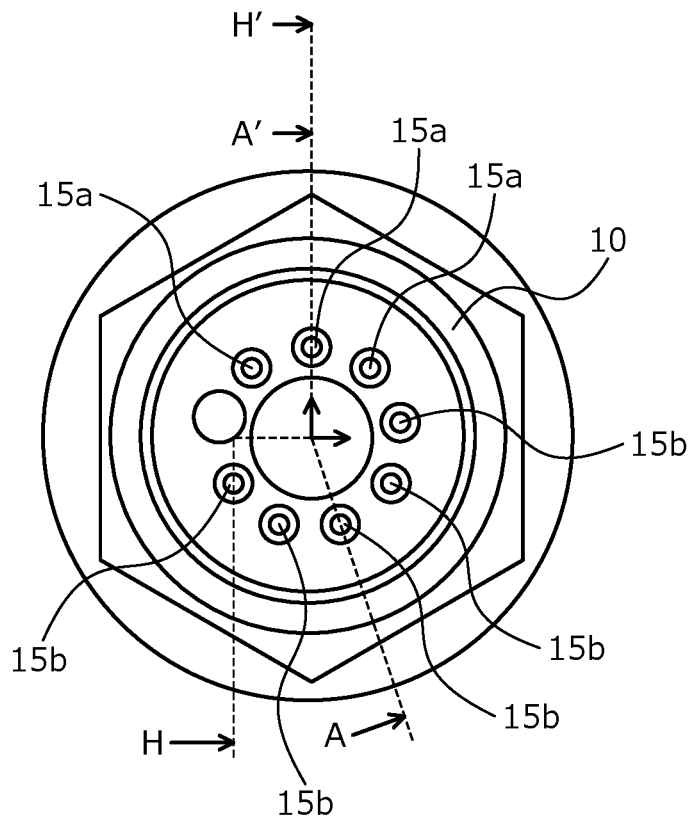
FIG. 12BA is a diagram depicting a state of the physical quantity sensor device according to the embodiment during manufacture (assembly).
Figure 12B:
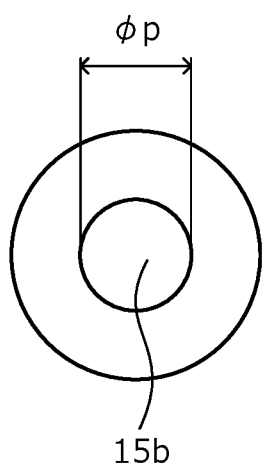

FIG. 12AA depicts the bottom of the inner housing portion 3 where the connector pins 31 are not exposed. FIG. 12AB is an enlarged view of a second groove 3fb. Further, FIG. 12BA depicts the side of the housing box 10 where the lead pins 15 are exposed. FIG. 12BB is an enlarged view of the second lead pins 15b.

In the example depicted in FIG. 12AA and FIG. 12AB, the inner housing portion 3 has three of the through-holes 3b and five grooves 3f. The through-holes 3b, as described above, are connected to the connector pins 31. The first lead pins 15a penetrate through the through-holes 3b to be connected to the connector pins 31. The grooves 3f include first grooves 3fa and the second grooves 3fb. The second lead pins 15b are fitted in the grooves 3f. In an instance in which the lead pins 15 have a length of about 8 mm, a length of the second lead pins 15b fitted in the grooves 3f is in a range from about 2 mm to 3 mm.

The shape of a cross-section of the lead pins 15 in the horizontal direction (cross-section of the lead pins 15 cut into round slices) is circular and therefore, the shape of the through-holes 3b and the first grooves 3fa is circular. A diameter of the through-holes 3b and the first grooves 3fa is φh. A diameter of the lead pins 15 is φp. A relationship thereof is φp≈φh.

When the shape of the second grooves 3fb is such that a length of an opposite end of the second grooves 3fb is less than a length φp, the second lead pins 15b are fit in the second grooves 3fb. Further, the shape of the second grooves 3fb is such that the limit of a force pushing the second lead pins 15b is not exceeded. In the example in FIG. 12AA and FIG. 12AB, the shape of the second grooves 3fb is a combination of strings and arcs. The shape of the second grooves 3fb may be a polygonal shape such as a substantially hexagonal shape or a substantially rectangular shape. For example, the length of the arcs of the second grooves 3fb is φh'. The length φh' and the length φp have a relationship of φh'<φp. For example, with consideration of dimension accuracy of the second grooves 3fb and the second lead pins 15b, φh' is about 5% to 10% less than φp. When the relationship is φh'=φp, the second lead pins 15b are shaved off when the second lead pins 15b are fitted into the second grooves 3fb, whereby an accurate fit may not be achieved and therefore, preferably, φh'<φp may be set as the relationship.

Further, when the number of the second grooves 3fb increases, the force for pushing the second lead pins 15b into the second grooves 3fb increases and therefore, there is a risk that the second lead pins 15b cannot be pushed in. Thus, preferably, the number of the second grooves 3fb may be from 1 to 3. Two of the second grooves 3fb is better than one and three of the second grooves 3fb is better than two. In an instance of three of the second grooves 3fb, surface fixation is achieved, whereby lifting of the inner housing portion 3 may be suppressed. Further, while the shape of the grooves 3f may preferably be that of the second grooves 3fb, the shape of the through-holes 3b may be the shape of the second grooves 3fb. For example, in an instance in which all five of the second lead pins 15b are cut, the second lead pins 15b are not fitted into the grooves 3f and therefore, of the three through-holes 3b, the shape of at least one of the through-holes 3b may be the shape of the second grooves 3fb. Further, for example, in an instance in which it is desirable for the number of the second grooves 3fb to be three to achieve surface fixation; however, of the five second lead pins 15b, three of the second lead pins 15b are cut and only two of the second lead pins 15b cannot be fitted in the grooves 3f, of the three through-holes 3b, the shape of one of the through-holes 3b may be the shape of the second grooves 3fb.

In this manner, for example, by changing the shape of a portion of the grooves 3f of the multiple grooves 3f from the circular shape to a shape in which the length of an opposite side is less than the diameter of the circular shape, the lead pins 15 have a structure that may be fitted in the grooves 3f. Therefore, lifting of the inner housing portion 3 during thermosetting of the adhesive 28 (FIG. 1A) may be suppressed. In other words, during thermosetting of the adhesive 28, formation of a gap at the bottom 3c of the inner housing portion 3 and the housing box 10 may be suppressed.

Figure 13A:
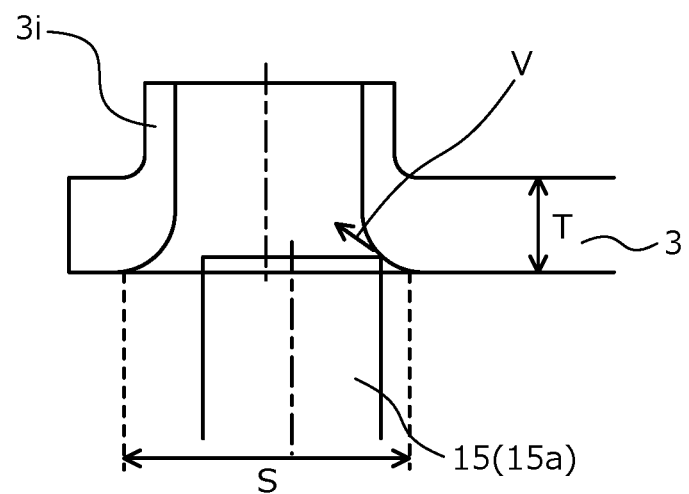
FIG. 13A is a diagram depicting a state of the physical quantity sensor device according to the embodiment during manufacture (assembly).

Next, a process of passing the first lead pins 15a through the through-holes 3b of the inner housing portion 3 to which the connector pins 31 are integrally molded is described using FIG. 13A. At the through-holes 3b of the inner housing portion 3 of the embodiment, the R-surface formed by the burring process is provided. Therefore, as depicted in FIG. 13A, the first lead pins 15a are inserted in the through-holes 3b from the side thereof having the R-surface, whereby a guide face S having an outer periphery that is greater than that of the through-holes 3b due to the R-surface is formed. A range of the guide face S is configured by the through-holes 3b and the R-surface. With this range of the guide face S, even when a shift in positioning of the first lead pins 15a and the through-holes 3b occurs due to position accuracy of the first lead pins 15a, the first lead pins 15a come in contact with the R-surface of the through-holes 3b; the first lead pins 15a move in the direction indicated by arrow V and are guided to the centers of the through-holes 3b, whereby the first lead pins 15a are inserted into the through-holes 3b.

Further, even in an instance in which the tips of the first lead pins 15a interfere with the edges of the through-holes 3b of the inner housing portion 3, insertion is possible without generation of stress large enough to destroy the material and without the first lead pins 15a being shave off, in the contact between the R-surface and the first lead pins 15a. As a result, the tips of the first lead pins 15a being shaved off by the inner housing portion 3 and pieces of metal falling do not occur. Therefore, short-circuiting of the housing box 10 and the first lead pins 15a due to foreign matter dropping in the sensor element 1 may be prevented, eliminating defects in the assembly process. Here, while an instance in which the R-surface is provided to the through-holes 3b is described, an instance in which a beveled shape is provided like that in FIG. 1D is similar.

Figure 13B:
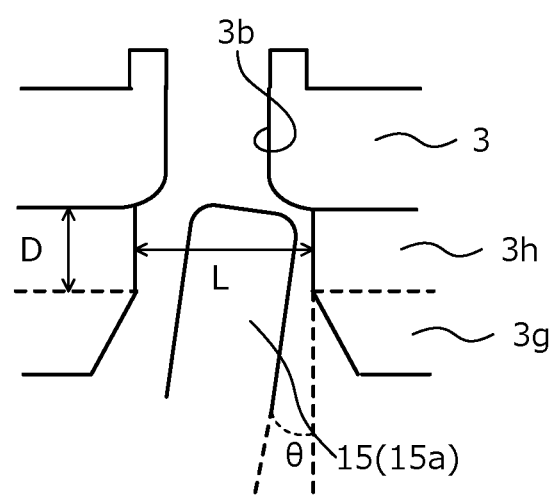
FIG. 13B is a diagram depicting a state of the physical quantity sensor device according to the embodiment during manufacture (assembly).

In the inner housing portion 3, a tapered portion 3g for inserting the first lead pins 15a may be further provided. Further, preferably, between the tapered portion 3g of the inner housing portion 3 and the inner housing portion 3, a straight portion 3h of the inner housing portion may be present. The straight portion 3h is a portion having a hole substantially aligned with the through-holes 3b. FIG. 13B depicts the process of passing the first lead pins 15a through the through-holes 3b of the inner housing portion 3 having the straight portion 3h. When the first lead pins 15a are passed through, insertion of the first lead pins 15a using a sidewall of the straight portion 3h as a guide enables smooth insertion.

Further, preferably, a diameter L and a length D of the straight portion 3h may be set so that an angle θ when the first lead pins 15a and the sidewall of the straight portion 3h contact each other is at most 10 degrees. When the angle exceeds 10 degrees, the load to the first lead pins 15a in a direction orthogonal to the insertion direction increases and as a result, the load exceeds the material strength of the first lead pins 15a and shaving occurs. On the other hand, when the angle is at most 10 degrees, no excess load is applied to the first lead pins 15a and therefore, the first lead pins 15a may be inserted without shaving thereof. As a result, insertability is significantly enhanced and shaving of the first lead pins 15a due to getting caught during insertion may be suppressed.

Figure 14:
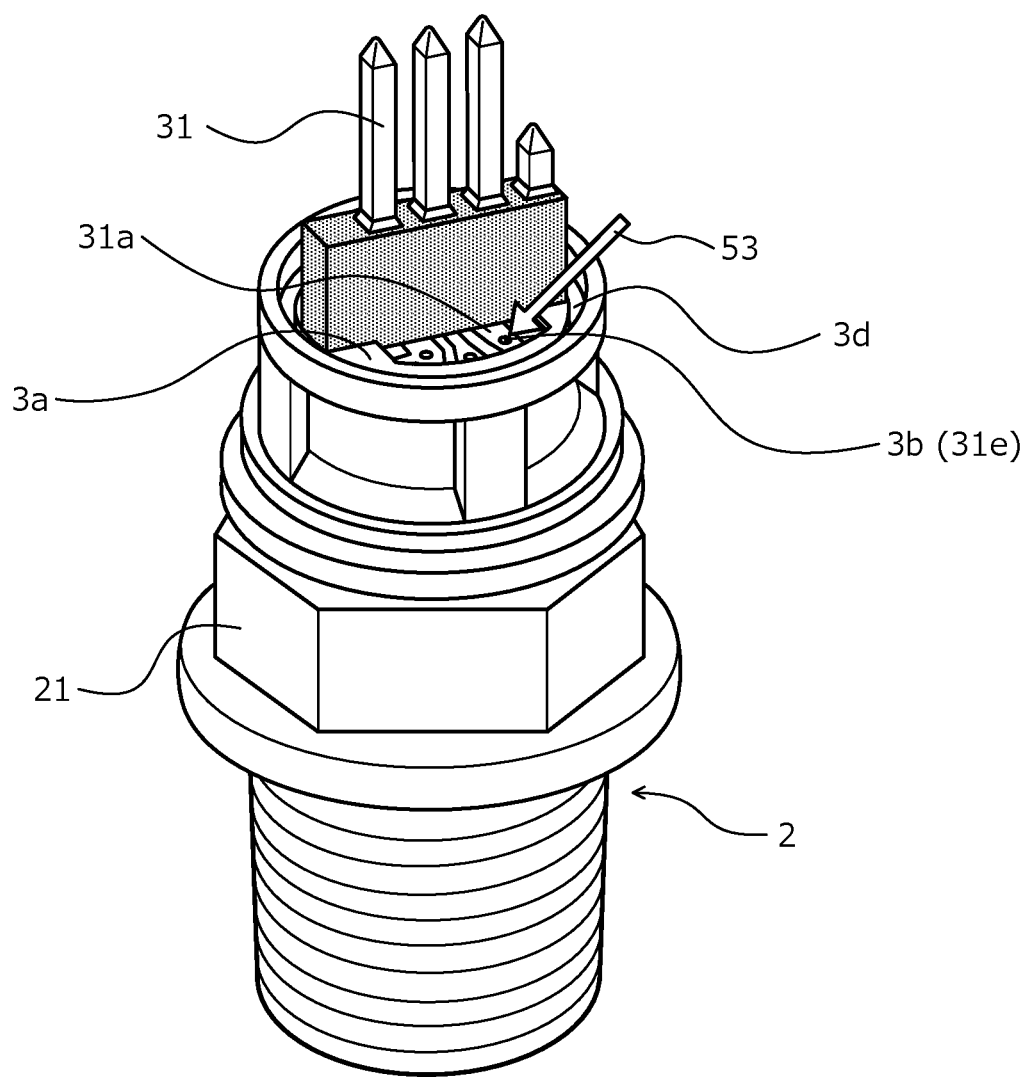
FIG. 14 is a diagram depicting a state of the physical quantity sensor device according to the embodiment during manufacture (assembly).

Next, as depicted in FIG. 14, concurrently when the first lead pins 15a are passed through the through-holes 3b of the inner housing portion 3 to which the connector pins 31 are integrally molded, the position of the inner housing portion 3 is determined by fitting the second lead pins 15b in the grooves 3f of the inner housing portion 3, and the inner housing portion 3 is fixed to the housing box 10 by the thermosetting adhesive 28 (FIG. 1A). For example, until the applied adhesive 28 cures, the inner housing portion 3 and the housing box 10 are left under a high-temperature state. At this time, the second lead pins 15b are fitted in the grooves 3f of the inner housing portion 3 and therefore, lifting of the inner housing portion 3 during the thermosetting of the adhesive 28 may be prevented, and pushing the inner housing portion 3 and the housing box 10 together is unnecessary. In this manner, easy assembly is possible.

At this time, the first lead pins 15a are in contact with the connector pins 31 exposed at the upper surface of the upper portion 3a of the inner housing portion 3 by the through-holes 3b of the inner housing portion 3. Further, at this stage, the socket housing portion 4 that covers the periphery of the connector pins 31 is not joined and therefore, above the inner housing portion 3, no members that become obstacles are disposed on an incident path of laser light 53. In other words, portions where the upper ends of the first lead pins 15a and the first ends 31a of the connector pins 31 contact each other are visible from nearly above.

Figure 15A:
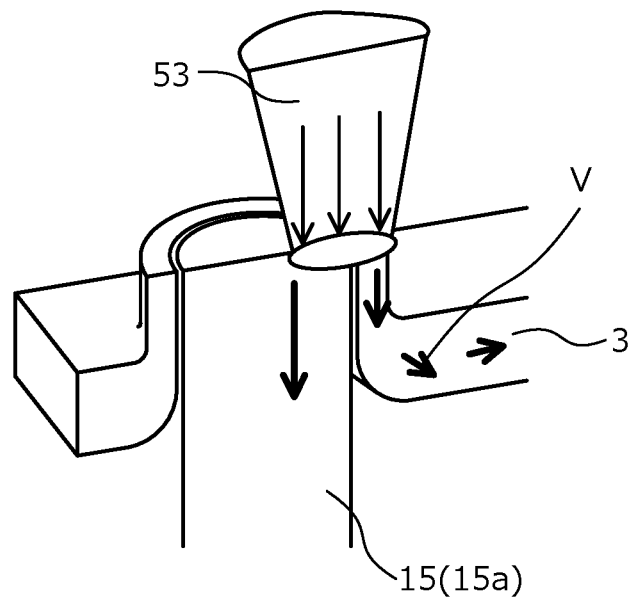
FIG. 15A is a diagram depicting a state of the physical quantity sensor device according to the embodiment during manufacture (assembly).
Figure 15B:
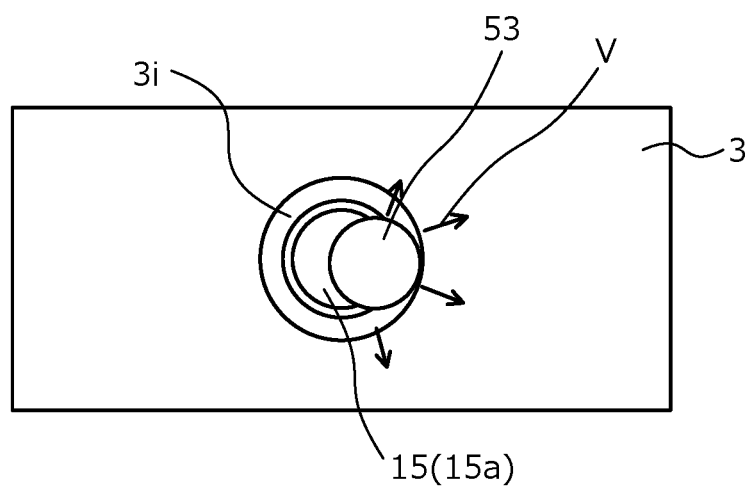
FIG. 15B is a diagram depicting a state of the physical quantity sensor device according to the embodiment during manufacture (assembly).
Figure 15C:
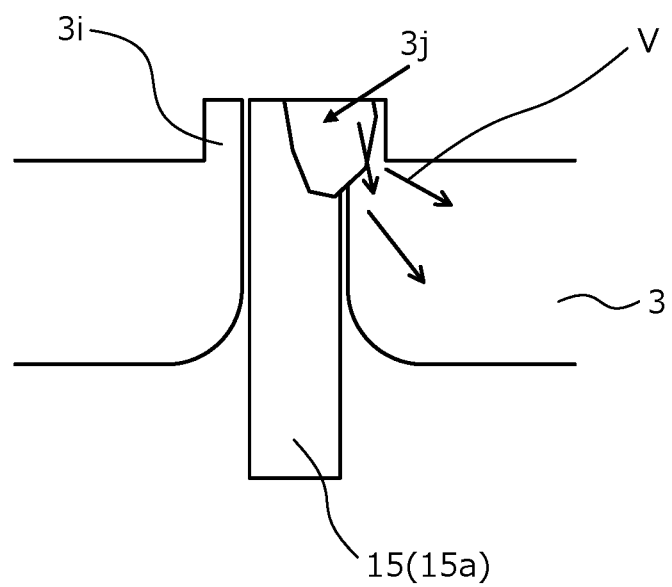
FIG. 15C is a diagram depicting a state of the physical quantity sensor device according to the embodiment during manufacture (assembly).

Next, a process of irradiating the laser light 53 at a predetermined angle of incidence from above the through-holes 3b of the inner housing portion 3, and welding (joining) the portions where the upper ends of the first lead pins 15a and the first ends 31a of the connector pins 31 contact each other is described. FIG. 15A is a perspective view of a welding process; FIG. 15B is a top view of the welding process; and FIG. 15C is a cross-sectional view of the welding process.

Here, a face opposite of the inner housing portion 3 to the R-surface thereof is processed into a pipe-shape (the pipe-shaped portion 3i) to be a shape of the first lead pins 15a present therein (refer to FIG. 1B, FIG. 1C). Therefore, in an instance in which the first lead pins 15a and the pipe-shaped portion 3i of the inner housing portion 3 is irradiated with laser, as indicated by arrows V in FIG. 15A to FIG. 15C, while heat from the laser wants to move in a planar portion of the inner housing portion 3, due to the pipe-shape, the cross-sectional area that transfers the heat is reduced, whereby the heat concentrates at portions where the first lead pins 15a and the pipe-shaped portion 3i of the inner housing portion 3 contact each other. As a result, a laser welding portion 3j of the inner housing portion is formed between the first lead pins 15a and the pipe-shaped portion 3i.

As a result, the necessary laser energy for welding may be reduced, whereby welding may even be performed by a low-cost welding device with a small output. Further, shifting of the surface of the inner housing portion 3 and the tips of the first lead pins 15a that are welding irradiation surfaces is extremely small and by controlling the height of laser irradiated surface, heat from the laser irradiation is generated at the irradiated surfaces of each of the members and dissolution of each of the members is also performed in a single plane, whereby quality welding is possible.

FIG. 16 depicts a cross-section of the inner housing portion 3 and the housing box 10 after being adhered to each other. The cross-section is along positions on cutting line A-A' in FIG. 12BA. In FIG. 16, the screw portion 2, the pressure sensor chip 11, etc. are not depicted. The first lead pins 15a are welded to the connector pins 31. In particular, for example, the upper ends of the first lead pins 15a penetrate through the through-holes 3b and are joined to the first ends 31a of the connector pins 31 and the horizontal portions 31b of the connector pins 31. Meanwhile, the second lead pins 15b and the grooves 3f are fitted to each other. Further, the second lead pins 15b are not cut and therefore, the second lead pins 15b and the first lead pins 15a have the same length.

Figure 17A:
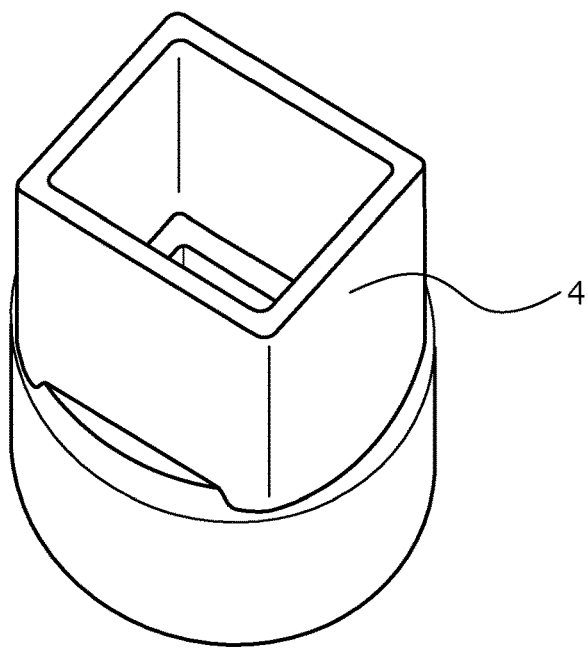
FIG. 17A is a diagram depicting a state of the physical quantity sensor device according to the embodiment during manufacture (assembly).
Figure 17B:
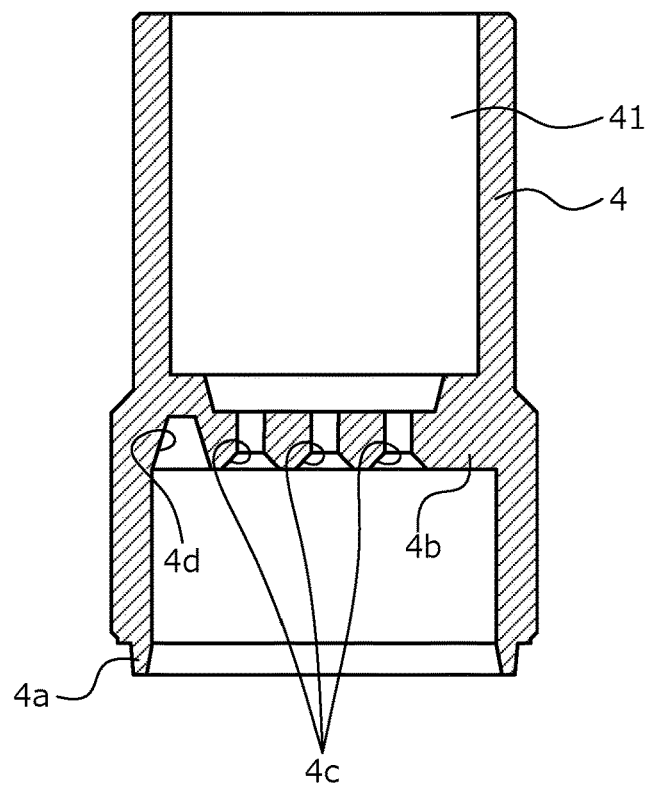
FIG. 17B is a diagram depicting a state of the physical quantity sensor device according to the embodiment during manufacture (assembly).

Next, the socket housing portion 4 is described using FIG. 17A and FIG. 17B.

FIG. 17A is a perspective view of the socket housing portion 4. FIG. 17B is a cross-sectional view of the socket housing portion 4. The socket housing portion 4 houses the vertical portions 31c of the connector pins 31. The socket housing portion 4, at a surface thereof joined to the inner housing portion 3, has the protrusion 4a that is fitted to the recess 3d of the inner housing portion 3.

Further, an interior of the socket housing portion 4 is recessed. At the bottom 4b of the recess of the socket housing portion 4, the through-holes 4c and the groove 4d are provided. At the bottom 4b, in a portion thereof near an inner wall of the socket housing portion 4, the groove 4d is provided and therefore, the portion of the bottom 4b where the groove 4d is provided is thicker than a portion of the bottom 4b where the through-holes 4c are provided. The first connector pin 31o to the third connector pin 31q penetrate through the through-holes 4c. The fourth connector pin 31r is inserted in the groove 4d. Further, the through-holes 4c and the groove 4d are shaped to enable the connector pins 31 to penetrate therethrough or be inserted therein, including the bottom 3c of the inner housing portion 3 as well. The position of the inner housing portion 3 may be determined by the positions of the groove 4d and the through-holes 4c.

Figure 18:
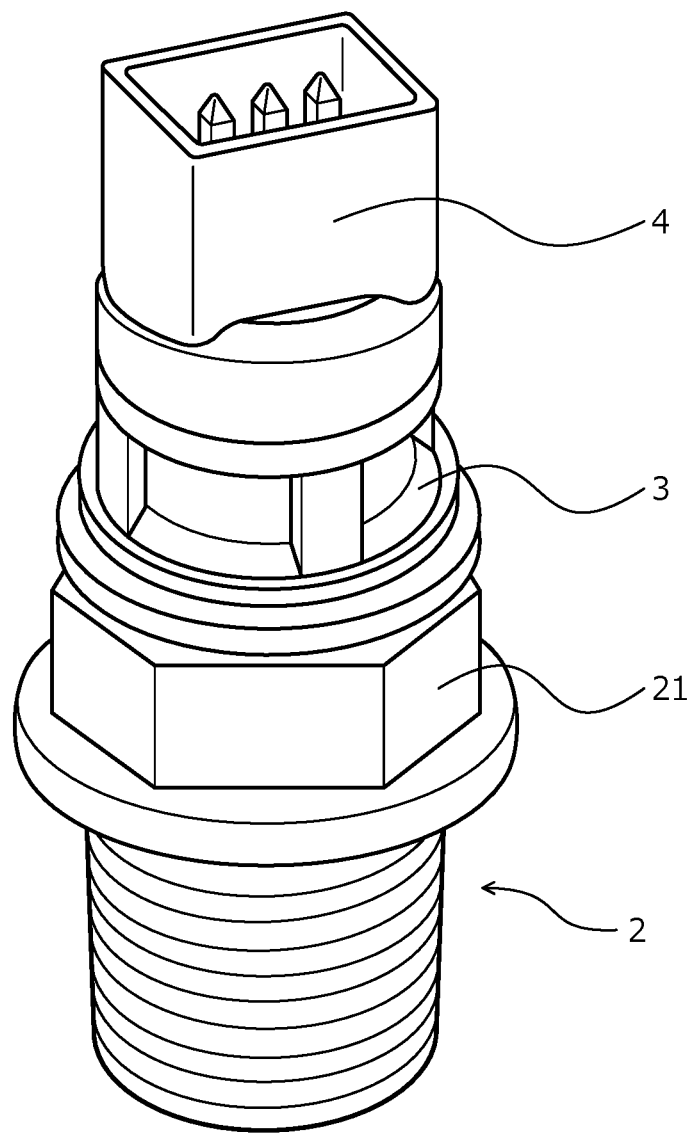
FIG. 18 is a diagram depicting a state of the physical quantity sensor device according to the embodiment during manufacture (assembly).

Next, a process of joining the socket housing portion 4 and the inner housing portion 3 is described using FIG. 18.

As depicted in FIG. 18, the socket housing portion 4 and the inner housing portion 3 are joined to each other by an adhesive. As a result, the socket housing portion 4 is joined to the upper surface of the upper portion 3a of the inner housing portion 3 so as to surround the periphery of the connector pins 31. At this time, for example, the first connector pin 31o to the third connector pin 31q penetrate through the through-holes 4c. The fourth connector pin 31r is inserted in the groove 4d and the first connector pin 310 to the third connector pin 31q penetrate through the through-holes 4c, respectively, whereby the inner housing portion 3 and the socket housing portion 4 are joined to each other.

Thereafter, an O-ring 26 (FIG. 1A) is mounted to a bottom surface of the pedestal 21 of the screw portion 2, whereby the physical quantity sensor device 100 depicted in FIG. 1A is completed.

As described above, according to the present embodiment, the through-holes of the inner housing portion have an R-surface formed by the burring process. As a result, even when the tip of a lead pin interferes with the edge of a through-hole of the inner housing, the lead pin may be inserted without generating stress large enough to destroy the material and shave off pieces of the lead pin. Therefore, short-circuiting due to foreign matter in the sensor element may be prevented, eliminating defects at the assembly process.

Further, the surface of the inner housing portion opposite to the R-surface has a pipe-shaped portion. As a result, in an instance in which a lead pin and the pipe-shaped portion are irradiated with laser, the cross-sectional area that transfers heat decreases, whereby the heat concentrates at a portion where the lead pin and the pipe-shaped portion are in contact with each other. Therefore, the amount of laser energy necessary for welding may be reduced, thereby enabling welding even by a low-cost welding device with a small output.

As described above, the physical quantity sensor device and the method of manufacturing a physical quantity sensor device according to the present invention are useful for, physical quantity sensor devices having a sensor chip to which pressure is applied from a recess-side (diaphragm-side) of a housing box, and are particularly suitable for pressure sensor devices.

The physical quantity sensor device according to the present invention enables reliability to be increased.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A sensor device for measuring a physical quantity, comprising:
   a sensor element having a semiconductor chip;
   a first terminal connected to the sensor element; and
   a housing portion having a terminal, which is a second terminal and is electrically connected to the first terminal, wherein
   the second terminal has a through-hole formed therein, the through-hole having a first end and a second end opposite to each other, an inner surface of the through hole at the first end being an R-surface that is a curved surface with a radius R, and
   the first terminal is housed in the housing portion, and has one end thereof inserted in the through-hole from the first end of the through-hole.

2. The sensor device according to claim 1, wherein the radius R is at least a half of a plate thickness T of the second terminal but not more than the plate thickness T of the second terminal.

3. The sensor device according to claim 1, wherein the second end of the through-hole forms a pipe-shaped portion.

4. The sensor device according to claim 3, wherein the one end of the first terminal protrudes from, or is recessed from, an end of the pipe-shaped portion by a length that is at most a half of a height of the pipe-shaped portion.

5. The sensor device according to claim 1, wherein
the housing portion has, at one side thereof, an inlet opening from which the first terminal is inserted, the inlet opening having an opening width greater than that of the through-hole of the second terminal, and
the inlet opening includes
   a tapered portion, and
   a straight portion in communication with the tapered portion, the straight portion having a hole substantially aligned with the through-hole.

6. The sensor device according to claim 5, wherein
the straight portion has a predetermined diameter and a predetermined length such that an angle at which the first terminal and a sidewall of the straight portion contact each other is at most 10 degrees.

7. The sensor device according to claim 1, further comprising:
   a medium inlet portion having an inlet opening for guiding a medium that is subject to measurement, the medium being a gas or a liquid for which a pressure thereof is measurable, and
   a pedestal provided at one end of the inlet opening, wherein
   the sensor element is located between the housing portion and the medium inlet portion, and is fixed on the pedestal.

8. The sensor device according to claim 1, wherein the R-surface is formed by a burring process.

* * * * *